(12) United States Patent
Sugiyama et al.

(10) Patent No.: US 9,286,819 B2
(45) Date of Patent: Mar. 15, 2016

(54) DISPLAY DEVICE, DISPLAY METHOD, INTEGRATED CIRCUIT, AND PROGRAM

(75) Inventors: Keiji Sugiyama, Kyoto (JP); Shinichi Shikii, Nara (JP); Katsuhiko Hayashi, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 135 days.

(21) Appl. No.: 13/808,407

(22) PCT Filed: May 2, 2012

(86) PCT No.: PCT/JP2012/002963

§ 371 (c)(1),
(2), (4) Date: Jan. 4, 2013

(87) PCT Pub. No.: WO2012/153499

PCT Pub. Date: Nov. 15, 2012

(65) Prior Publication Data

US 2013/0113685 A1    May 9, 2013

(30) Foreign Application Priority Data

May 10, 2011 (JP) ................................ 2011-105748

(51) Int. Cl.
*G09G 3/20* (2006.01)
*G02B 27/00* (2006.01)
(Continued)

(52) U.S. Cl.
CPC .............. *G09G 3/20* (2013.01); *G02B 27/0093* (2013.01); *G02B 27/22* (2013.01); *G09G 3/003* (2013.01);
(Continued)

(58) Field of Classification Search
CPC ............ H04N 13/004; H04N 13/0007; H04N 19/00769; G06K 9/00288; G06F 21/30; G06F 21/31; G06F 21/312; G06F 21/34; G06F 21/60; G09G 3/20; G09G 3/003; G09G 3/3406; G09G 2300/023; G09G 2354/00

USPC ............... 340/5.54, 815.4–815.92; 345/7, 32, 345/156; 349/15, 90; 713/186; 726/26
See application file for complete search history.

(56) References Cited

U.S. PATENT DOCUMENTS 5,671,035 A * 9/1997 Barnes ........................... 351/45
6,864,912 B1 * 3/2005 Mahaffey et al. ............... 348/61
(Continued)

FOREIGN PATENT DOCUMENTS

| CN | 1539095 | 10/2004 |
|----|---------|---------|
| CN | 1917564 | 2/2007 |

(Continued)

OTHER PUBLICATIONS

International Search Report issued Jul. 31, 2012 in corresponding International Application No. PCT/JP2012/002963.
(Continued)

*Primary Examiner* — Dwayne Bost
*Assistant Examiner* — Stefan M Oehrlein
(74) *Attorney, Agent, or Firm* — Wenderoth, Lind & Ponack, L.L.P.

(57) ABSTRACT

A display device includes: a light source which emits light; a position detection unit which detects an eye position of a user; a light deflection unit which deflects the emitted light toward the eye position detected by the position detection unit; a user identification unit which identifies which one of persons is the user; a deflection control unit which controls a deflecting direction in which the light deflection unit deflects the light, depending on the person identified as the user; and a liquid crystal display panel which receives the light from the light deflection unit and display an image formed by the light.

17 Claims, 26 Drawing Sheets

(51) Int. Cl.
  *G02B 27/22* (2006.01)
  *H04N 13/04* (2006.01)
  *G09G 3/00* (2006.01)
  *G09G 3/34* (2006.01)

(52) U.S. Cl.
  CPC ........... *G09G 3/3406* (2013.01); *H04N 13/047* (2013.01); *H04N 13/0418* (2013.01); *H04N 13/0452* (2013.01); *G09G 2300/023* (2013.01); *G09G 2354/00* (2013.01); *G09G 2358/00* (2013.01); *H04N 2013/0465* (2013.01)

(56) References Cited

U.S. PATENT DOCUMENTS

| | | | |
|---|---|---|---|
| 7,058,252 B2 | 6/2006 | Woodgate et al. | |
| 7,630,131 B2 | 12/2009 | Hamagishi et al. | |
| 8,077,195 B2 | 12/2011 | Großmann | |
| 8,462,409 B2 | 6/2013 | Olaya | |
| 2003/0222978 A9 * | 12/2003 | Thomason | 348/52 |
| 2004/0240777 A1 | 12/2004 | Woodgate et al. | |
| 2006/0007135 A1 * | 1/2006 | Imagawa et al. | 345/156 |
| 2006/0125917 A1 * | 6/2006 | Cha et al. | 348/51 |
| 2006/0273984 A1 * | 12/2006 | Wanda et al. | 345/7 |
| 2008/0225373 A1 | 9/2008 | Hamagishi et al. | |
| 2008/0246837 A1 | 10/2008 | Schultz et al. | |
| 2009/0201363 A1 | 8/2009 | Grossmann | |
| 2009/0244309 A1 * | 10/2009 | Maison et al. | 348/222.1 |
| 2009/0316115 A1 * | 12/2009 | Itoh et al. | 353/20 |
| 2010/0013957 A1 | 1/2010 | Miyasaka et al. | |
| 2010/0033782 A1 * | 2/2010 | Olaya | 359/9 |
| 2010/0149073 A1 * | 6/2010 | Chaum et al. | 345/8 |
| 2010/0157425 A1 | 6/2010 | Oh | |
| 2010/0205667 A1 * | 8/2010 | Anderson et al. | 726/19 |
| 2010/0277762 A1 * | 11/2010 | Eguchi et al. | 358/1.15 |
| 2011/0157211 A1 | 6/2011 | Nakahara et al. | |
| 2011/0199497 A1 * | 8/2011 | Motta | 348/218.1 |
| 2011/0206285 A1 * | 8/2011 | Hodge et al. | 382/224 |
| 2011/0316847 A1 * | 12/2011 | Cheng | 345/419 |
| 2012/0212510 A1 * | 8/2012 | Hewitt et al. | 345/650 |
| 2013/0093762 A1 * | 4/2013 | Sugiyama et al. | 345/419 |

FOREIGN PATENT DOCUMENTS

| | | |
|---|---|---|
| CN | 101762880 | 6/2010 |
| JP | 7-98439 | 4/1995 |
| JP | 2005-49656 | 2/2005 |
| JP | 2007-6052 | 1/2007 |
| JP | 2008-36005 | 2/2008 |
| JP | 2008-197447 | 8/2008 |
| JP | 2008-225334 | 9/2008 |
| JP | 2009-31368 | 2/2009 |
| JP | 2009-544992 | 12/2009 |
| JP | 2010-151951 | 7/2010 |
| JP | 2010-524047 | 7/2010 |
| TW | 200907414 | 2/2009 |
| WO | 2008/011888 | 1/2008 |
| WO | 2008/102883 | 8/2008 |
| WO | 2008/124709 | 10/2008 |
| WO | 2011/018888 | 2/2011 |

OTHER PUBLICATIONS

Office Action issued Nov. 26, 2015 in Chinese Application No. 201280001936.5 with English translation of the Search Report.
Office Action and Search Report issued Mar. 30, 2015 in Chinese Application No. 201280001936.5, with partial English translation.

* cited by examiner

FIG. 14

| Information name | Access level | Display area |
|---|---|---|
| Information 1 | Confidential | (0, 0)(500, 500) |
| Information 2 | General | (500, 0)(1000, 1000) |
| Information 3 | General | |
| ... | ... | ... |

| User name | Right-eye angle | Left-eye angle | Right-hand position | Left-hand position | Terminal inclination |
|---|---|---|---|---|---|
| User 1 | 15 degrees | -15 degrees | (1000, 500) | (0, 500) | 20 degrees |
| User 2 | 10 degrees | -20 degrees | (500, 500) | (0, 500) | 10 degrees |
| ... | ... | ... | ... | ... | ... |

1803t

DISPLAY DEVICE, DISPLAY METHOD, INTEGRATED CIRCUIT, AND PROGRAM

TECHNICAL FIELD

The present invention relates to a display device including a light source which emits light, a position detection unit which detects eye positions of users, a light deflection unit which deflect the emitted light toward the eye positions detected by the position detection unit, and a display unit which receives the light from the light deflection unit and displays images formed by the light.

BACKGROUND ART

There has been a display device including a light source which emits light, a position detection unit which detects eye positions of users, a light deflection unit which deflects the emitted light toward the eye positions detected by the position detection unit, and a display unit which receives the light from the light deflection unit and displays images formed by the light (see Patent Literatures 1 and 2, for example).

CITATION LIST

Patent Literature

[PTL 1] Japanese Unexamined Patent Application Publication (Transition of PCT Application) No. 2010-524047

[PTL 2] Japanese Unexamined Patent Application Publication No. 7-98439

SUMMARY OF INVENTION

Technical Problem

An image may be viewed by a user who is inappropriate to view the image.

The present invention, conceived to address this problem, has an object of providing a display device, a display method, and others which prevent images from being viewed by inappropriate users and limit viewers of the images to appropriate users with higher certainty.

Solution to Problem

In order to achieve the object, a display device according to an aspect of the present invention includes: a light source which emits light; a position detection unit configured to detect an eye position of a user; a light deflection unit configured to deflect the emitted light toward the eye position detected by the position detection unit; an identification unit configured to identify which one of persons is the user; a control unit configured to control a deflecting direction in which the light deflection unit deflects the light, depending on the person identified as the user; and a display unit configured to receive the light from the light deflection unit and display an image formed by the light.

It should be noted that general and specific aspects of the present invention can be implemented as a system, a method, an integrated circuit, a computer program, a recording medium, or any combination of a system, a method, an integrated circuit, a computer program, and a recording medium.

Advantageous Effects of Invention

The display device according to the present invention does not allow inappropriate users to view images and allows, with higher certainty, only appropriate users to view the images.

BRIEF DESCRIPTION OF DRAWINGS

FIG. 14 illustrates an example of a table for management of access levels of information.

FIG. 21 illustrates an exemplary history of light deflection toward users.

DESCRIPTION OF EMBODIMENTS

Embodiments of the present invention will be described below using the drawings. The same components are denoted with the same reference signs, and therefore description thereof may be omitted. For ease of understanding, the drawings schematically illustrate the components with focus thereon.

Techniques described in the embodiments relate to illumination devices which are capable of deflecting output light and thereby can be used as three-dimensional liquid crystal display devices or privacy displays, and to liquid crystal display devices each including the illumination device.

(Underlying Knowledge Forming Basis of the Present Invention)

The following will describe the underlying knowledge forming the basis of the present invention. The liquid crystal display device is a type of image display device. The liquid crystal display device includes a liquid crystal display panel as a spatial light modulator. The spatial light modulator spatially modulates light emitted from behind the liquid crystal display panel by a panel lighting device (backlight) and passing through the liquid crystal display panel, and thereby displays an image.

In recent years, three dimensional (3D) display devices capable of displaying 3D images are being developed with the aim of achieving images with enhanced sense of presence using such a display device. Displaying a 3D image is achieved by showing two different images to right and left eyes of a viewer, respectively, to cause binocular disparity. There have been various methods proposed to achieve such a 3D display.

For example, 3D display systems including glasses with a special optical function have been proposed and already marketed by various manufacturers.

However, since the glasses are necessary for users of the systems to view 3D images, there is still demand for glasses-free 3D display devices which allow users to view 3D images without such glasses.

For example, one of such glasses-free 3D display devices includes a light guide plate having a special shape and light sources placed at opposite ends of thereof. The 3D display device is configured such that light exits the light guide plate and converges onto the right eye of a user when one of the light sources (for example, the right one) lights up, and onto the left eye when the other (for example, the left one) lights up (see Patent Literature 1 for an example).

In another exemplary method, a light deflection unit which changes the direction of light dynamically changes positions onto which light from the light guide plate converges. In other words, this method enables glasses-free stereoscopy by switching between a state in which light from the display enters only a right eye and a state in which light from the display enters only a left eye (see Patent Literature 2 for an example).

Figure 1:
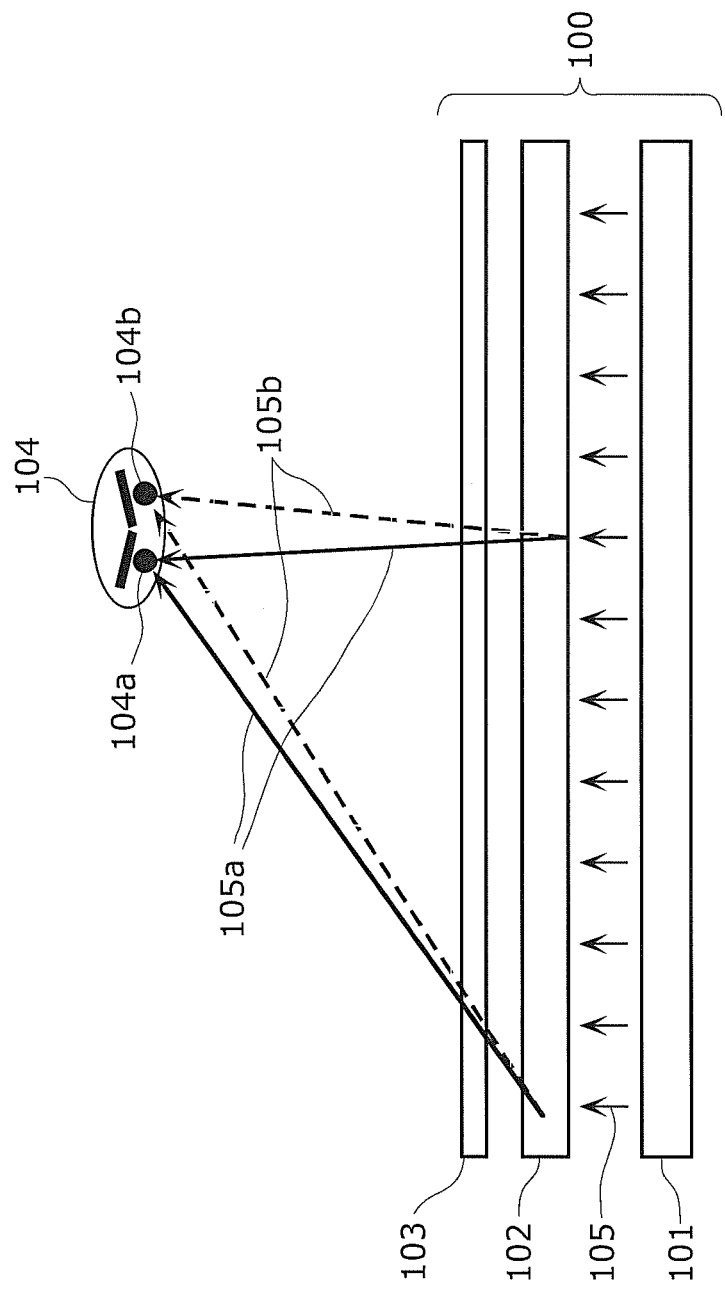
FIG. 1 illustrates an exemplary configuration of a liquid crystal display device according to a prior literature.

FIG. 1 illustrates a glasses-free 3D display device including a light deflection unit.

A liquid crystal display device 100 includes a light source 101, a light deflection unit 102, and a liquid crystal display panel 103. The light source 101 emits planar illumination light 105.

The light deflection unit 102 may be a device having refractivity which can be changed by application of a voltage or a device including a micro electro mechanical system (MEMS) mirror.

The light deflection unit 102 deflects the illumination light 105 emitted from the light source 101 in a direction such that the deflected illumination light 105 enters a right eye 104a of a user 104 as light 105a for a predetermined period of time. After the predetermined period of time, the light deflection unit 102 in turn deflects the illumination light 105 in a direction such that the deflected illumination light 105 enters a left eye 104b of the user 104 as light 105b.

A liquid crystal display panel 103 is provided between the light deflection unit 102 and the user 104 as illustrated in FIG. 1. Images are formed on the liquid crystal display panel 103 by the light which exits the light deflection unit 102 and with which the liquid crystal display panel 103 is illuminated.

A right-eye image is set on the liquid crystal display panel 103 while the illumination light 105 is deflected and converges as the light 105a onto the right eye 104a, and a left-eye image is set on the liquid crystal display panel 103 while the illumination light 105 is deflected and converges as the light 105b onto the left eye 104b. This allows the user 104 to view a 3D image.

On the other hand, such an image display device can be also used not only as a 3D image display device but also as a privacy display (a display device capable of preventing onlookers from seeing images displayed thereon) because the image display device can limit a range where a user can see light forming an image.

However, it is difficult to detect eye positions of users or covering multiple eye positions using the above-described techniques.

For example, in the method in which the light deflection unit is used, detecting eye positions of users is prerequisite for determination of directions of light deflection.

Eye positions are generally detected using a stereo camera. However, a display device fails to properly deflect light toward eyes of users when the stereo camera is unable to capture an image of the eyes because of insufficient brightness or malfunction of the stereo camera. In this case, there is a problem that the user cannot see any image displayed on the display device.

Furthermore, in the case disclosed in Patent Literature 1 the user cannot view 3D images at any position other than a predetermined viewing position which is fixed. It is therefore difficult for two or more users to concurrently view 3D images.

Figure 2:
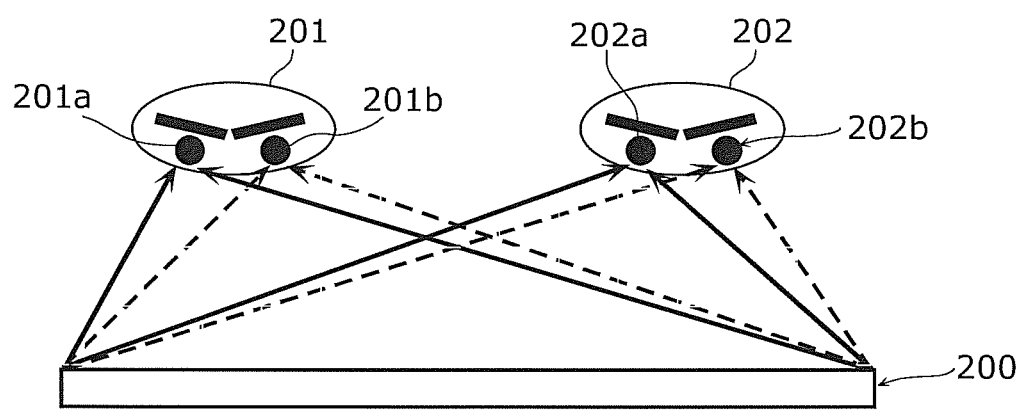
FIG. 2 illustrates an example of light deflection toward plural users.

The inventors of the present invention have conceived the following technique for such a method in which the light deflection unit is used. It is possible to allow the two or more users to concurrently view 3D images by deflecting light toward the eyes of the users in sequence. FIG. 2 illustrates an example for the technique.

In FIG. 2, two users 201 and 202 are using a liquid crystal display device 200.

The liquid crystal display device 200 in FIG. 2 includes a light deflection unit similar to the light deflection unit in FIG. 1, but there is a difference between them as follows. The liquid crystal display device 200 in FIG. 2 and the liquid crystal display device 100 in FIG. 1 are different in that the liquid crystal display device 200 changes positions of light to enter the eyes of the users in order of the positions 201*a*, 202*a*, 201*b*, and 202*b* using the light deflection unit.

The liquid crystal display device 200 in FIG. 2 performs the operation so that images can be displayed to the users.

However, there is the following problem with the technique illustrated in FIG. 2 when it is used as it is. If light is deflected toward eyes of users without limitation, information is shown to all users looking at the display. It is therefore difficult to use the liquid crystal display device as a privacy display.

In the case illustrated in FIG. 2, images are shown not only to the user 201 but also to the user 202 looking at the liquid crystal display device 200 even while the user 201 is using the liquid crystal display device as a privacy display. This operation of a privacy display is unfavorable.

The present technique is a solution to the above problem with the conventional technique. Specifically, it is possible to detect eye positions of users in a simple way by using the present technique, and thereby a liquid crystal display device can be provided which has increased usability for plural users.

In order to solve the above-described problem, provided is a display device (300) according to the present invention which is a display device (information display device, liquid crystal display device) including: a light source (light source 301) which emits light (light 305 in FIG. 3); a position detection unit (position detection unit 402) configured to detect an eye position of a user (user 304 in FIG. 3); a light deflection unit (light deflection unit 302) configured to deflect the emitted light toward the eye position detected by the position detection unit; an identification unit (user identification unit 502) configured to identify which one of persons (Users 1 and 2 in FIG. 13) is the user; a control unit (deflection control unit 403) configured to control a deflecting direction in which the light deflection unit deflects the light, depending on the person identified as the user; and a display unit (liquid crystal display panel) configured to receive the light from the light deflection unit and display an image formed by the light.

In this configuration, appropriate display of information is achieved by controlling directions of light deflection according to content of the information or an access right of each user.

For example, when a user is identified as an inappropriate person to view an image, light forming the image is not deflected toward the position of the user. It is therefore possible to prevent the image from being view by the inappropriate person as a result of displaying the image even to the inappropriate person. Those who are allowed to view the image are thereby limited to appropriate persons with higher certainty.

Furthermore, the display device may include a display information management unit (display information management unit 503) configured to hold information (tables 502*t* and 503*t*) indicating whether or not each of the persons has a right to access a display information item (for example, image 612 in FIG. 6) which is at least a part of the image, wherein when the information indicates that the person (for example, User 2 in FIG. 13) identified as the user by the identification unit does not have the right, the control unit may be configured to control the deflecting direction of the light deflection unit to prevent light (light 1303 in FIG. 15) forming an image of the display information item (image 612) from entering the eye of the user (user 192), the light forming the image of the display information item being at least a part of the light (light 305).

In this configuration, it is possible to prevent information from being displayed to a user without a right to access the information, and thereby protection of privacy can be increased.

Furthermore, the display device may include a user image capturing unit (eye cameras 306*a* and 306*b*) configured to capture an image of the user, wherein the identification unit may be configured to identify which one of the persons is the user, based on the image captured by the user image capturing unit.

In this configuration, it is possible to simply and easily identify users without causing the users to take trouble such as entry of a password.

Furthermore, the display device may include a shape recognition unit (eye-shape recognition unit 501) configured to recognize at least one of a contour and an eye shape of the user in the image captured by the user image capturing unit, wherein the identification unit (user identification unit 502) may be configured to perform the identifying using the recognized at least one of the contour and the eye shape of the user.

In this configuration, it is possible to identify users based on characteristics of the users with higher accuracy.

Furthermore, the user may wear a signaling device which emits information for use in the identifying by the identification unit, and the identification unit may be configured to receive the information emitted from the signaling device to identify which one of the persons is the user.

In this configuration, it is possible to identify users with higher accuracy even when capturing images of the users is difficult for some reasons, such as insufficient brightness.

Furthermore, the identification unit may be configured to identify each one of the two or more users, and the control unit may be configured to deflect the light emitted from the light source toward each of the two or more users in turn.

In this configuration, it is possible to display different information items to the users at the same time with higher security.

Furthermore, the display unit may be capable of concurrently displaying at least two display information items (images 611 and 612) each as the display information item, the at least two display information items requiring different access rights, the held information (tables 502*t* and 503*t*) may indicate whether or not each of the persons (Users 1, 2, ... ) has rights to access the display information items, and the control unit may be configured to control the deflecting direction of the light deflection unit, according to whether or not the identified person has the rights to access the display information items (images 611 and 612).

In this configuration, it is possible to increase both flexibility in information display and security of information.

Furthermore, the display unit may be capable of alternately displaying a right-eye disparity image and a left-eye disparity image (images in FIG. 18) for displaying an image in three-dimensional mode, the identification unit may be configured to hold information for determining, for each of the users (A and in FIG. 18), whether the image is to be displayed in two-dimensional mode or in the three-dimensional mode, and the control unit may be configured to control the deflecting direction of the light deflection unit to cause only one of light (right-eye disparity image in FIG. 18) forming the right-eye disparity image and light forming the left-eye disparity image to enter right and left eyes of the user (B in FIG. 18) for whom the image is determined to be displayed in the two-dimensional mode.

In this configuration, it is possible to easily switch between 2D display mode and 3D display mode.

Furthermore, the display device according to the present invention may include a terminal state obtainment unit (terminal state obtainment unit 1702) configured to obtain terminal information (Columns 4 to 6 in FIG. 21) indicating at least one of a position of a hand of the user holding a terminal and an inclination of the terminal, wherein the position detection unit may include deflection history storage unit (deflection history storage unit 1803) configured to store information on the eye position of the user (Columns 2 and 3) and the terminal information (Columns 4 to 6) in association with each other, and may be configured to search for the information (Columns 2 and 3) associated with the terminal information (Columns 4 to 6) to estimate an eye position of the user.

In this configuration, it is possible to estimate eye positions of users even when it is impossible to user eye cameras to capture images of the eyes of the users.

Furthermore, in the liquid crystal display device according to the present invention, the information on the eye position of the user (Columns 2 and 3) may be operation history of the light deflection unit.

In this configuration, it is possible to easily calculate a deflecting direction in which light is deflected to enter eyes of a user. For example, the angles shown in FIG. 21, such as the right-eye angle in each row may be a right-eye angle previously recorded during an operation of the display device.

Furthermore, the liquid crystal display device according to the present invention may include a manual deflection adjustment unit configured to allow the user to adjust the deflecting direction of the light deflection unit.

In this configuration, it is possible for a user to determine the most favorable direction of light deflection on the user's own. Examples of the manual deflection adjustment unit include a key or a button to be worked by the user. The user may work the key or button to adjust or change the deflecting direction.

The display device according to the present invention may include a user image capturing unit (eye camera 2102) configured to capture an image of the user, wherein the position detection unit may be configured to store a reference image (image 2401) which is an image of the user looking at the display device at a standard viewing distance (L1 in FIG. 26), and based on estimation of a viewing distance (L2) of the user by comparison of the image (image 2402) captured by the user image capturing unit to the reference image, determine the eye position of the user.

In this configuration, it is possible to estimate a viewing distance of a user without using a stereo camera. This produces an advantageous effect of reducing the cost of a terminal.

The display device according to the present invention may include an output evaluation unit (output evaluation unit 2602) configured to evaluate intensity of the light emitted from the light source, wherein when the output evaluation unit evaluates the intensity as being higher than a reference value, the light deflection unit may be configured to set the deflecting direction of the light deflection unit to prevent the light from entering an eye of the user.

In this configuration, it is possible to provide users with a safer display device.

Use of the illumination device according to the present invention or the liquid crystal display device including the illumination device enables easy estimation of eye positions of users, so that it is possible to provide a display device which provides increased privacy protection even for users using the display device at the same time.

It is possible to direct light forming an image toward an appropriate position with higher certainty.

Furthermore, the identification unit may be configured to identify whether the user whose position has been detected is a person 2901 less distant than an other person 2902 from a straight line (straight line 2903 in FIG. 30) passing through a center of a display surface of the display device or the other person 2902 more distant than the person from the straight line, and the control unit may be configured to cause the light to enter the detected position when the user is identified as the less distant person, and prevent the light from entering the detected position when the user is identified as the more distant person.

This makes it possible to prevent light from entering eyes of an inappropriate person, with relatively high accuracy.

Furthermore, the identification unit may be configured to identify whether the user whose position has been detected is a person 3001 at a viewing distance within a predetermined range 3003 (see FIG. 31) from the display device or a person 3002 at a viewing distance out of the predetermined range 3003, and the control unit may be configured to cause the light (305 in FIG. 3) to enter the detected position when the user is identified as the person at the viewing distance within the predetermined range, and prevent the light from entering the detected position when the user is identified as the person at the viewing distance out of the predetermined range.

This makes it possible to prevent light from entering eyes of an inappropriate person, with relatively high accuracy.

Furthermore, the identification unit may be configured to identify whether the user whose position has been detected is a person 3101 having eyes positioned along a predetermined direction (direction 3101d in FIG. 32) or a person 3102 having eyes positioned not along the predetermined direction, and the control unit may be configured to cause the light to enter the detected position when the user is identified as the person having the eyes positioned along the predetermined direction, and prevent the light from entering the detected position when the user is identified as the person having the eyes positioned not along the predetermined direction.

This makes it possible to prevent light from entering eyes of an inappropriate person, with relatively high accuracy.

Furthermore, the identification unit may be configured to identify whether the user whose position has been detected is a person 3201 located within a viewing angle range 3203 (FIG. 33) of the display device or a person located out of the viewing angle range 3203, and the control unit may be configured to cause the light to enter the detected position when the user is identified as the person 3201 located within the viewing angle range, and prevent the light from entering the detected position when the user is identified as the person 3202 located out of the viewing angle range.

This makes it possible to prevent light from entering eyes of an inappropriate person, with relatively high accuracy.

It should be noted that general and specific aspects of the present invention can be implemented as a system, a method, an integrated circuit, a computer program, a recording medium, or any combination of a system, a method, an integrated circuit, a computer program, and a recording medium.

Each of the exemplary embodiments described below shows a specific preferable example of the present invention. The values, materials, constituent elements, layout and connection of the constituent elements, steps, and the order of the steps in the embodiments are given not for limiting the present invention but merely for illustrative purposes only.

Therefore, among the constituent elements in the following exemplary embodiments, constituent elements not recited in an independent claim defining the most generic part of the inventive concept of the present invention are described as optional constituent elements to be included in a more preferable embodiment.

Embodiment 1

Embodiment 1: Securing Security

A configuration of a liquid crystal display device capable of concurrently showing 3D images to plural users by using light deflection elements will be described in Embodiment 1. In the configuration, the liquid crystal display device secures security of information and privacy of the users.

Figure 3:
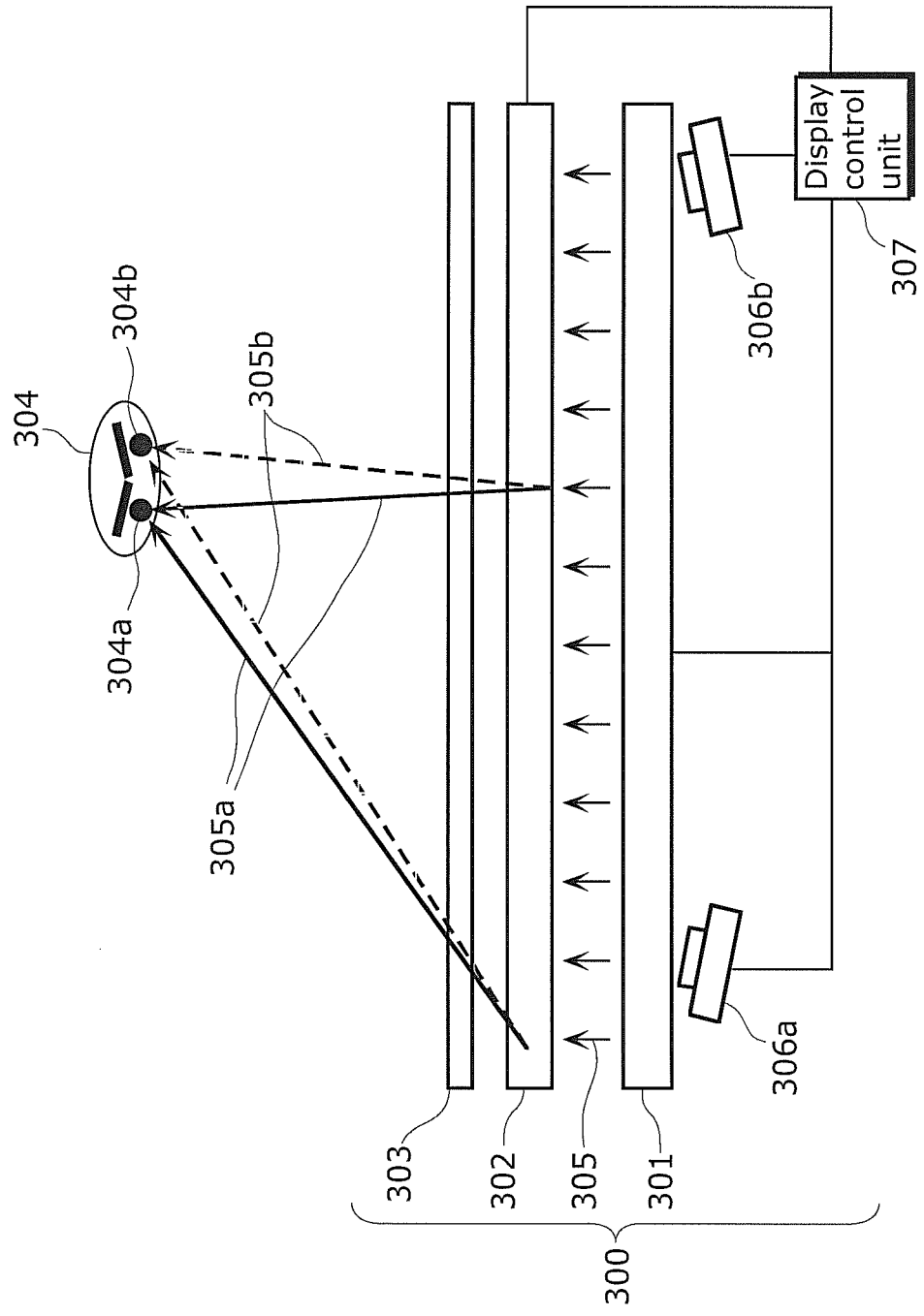
FIG. 3 illustrates an exemplary configuration of a liquid crystal display device in Embodiment 1 of the present invention.

FIG. 3 is a schematic view illustrating a liquid crystal display device 300 according to Embodiment 1.

The liquid crystal display device 300 includes a light source 301 which emits planar light (illumination light) 305, a light deflection unit 302, a liquid crystal display panel 303, a right eye camera 306a located on the right when seen from a user 304, a left eye camera 306b located on the left when seen from the user 304, and a display control unit 307.

The light source 301 emits planar light 305 to illuminate the liquid crystal display panel 303 in order to produce light to form images to be displayed to the user 304.

The light source 301 may include an array of white light-emitting diodes (LEDs) or may include an array of red, blue, and green LEDs. In this case, the liquid crystal display device need not include a light guide plate. Alternatively, the light source 301 may include LEDs, cold cathode fluorescent lamps, or lasers placed at ends of a light guide plate and to be turned on there. The light source 301 is lot limited to the examples herein.

The light deflection unit 302 deflects the illumination light 305 toward users. In Embodiment 1, the light deflection unit 302 includes elements having refractivity which can be changed by application of a voltage. Due to such elements having variable refractivity included as the light deflection unit 302, the light deflection unit 302 need not include a moving part. As a result, the liquid crystal display device 300 has increased reliability and durability.

A lens may be provided between the light deflection unit 302 and the liquid crystal display panel 303 to increase angles of light deflection. Alternatively, for example, the liquid crystal display device 300 may be provided with a light deflection unit including the lens and the light deflection unit 302. In this configuration, the user 304 can see appropriate images even at a relatively short viewing distance from the liquid crystal display panel 303. This produces an advantageous effect that the liquid crystal display device to serve as a 3D liquid crystal display device or a privacy display has a wider viewing angle.

Alternatively, an element including a micro electro mechanical system (MEMS) mirror may be used as the light deflection unit 302. In this case, the illumination light 305 can be deflected over a relatively wide angle range, so that displayed images remain viewable to the user 304 making a large movement of the head.

The eye camera 306a and eye camera 307b each capture an image of the eyes of the user 304 and provides the display control unit 307 with data of the captured image.

The display control unit 307 detects positions of the eyes of the user 304, and determines directions in which the light deflection unit 302 deflects the illumination light 305.

Figure 4:
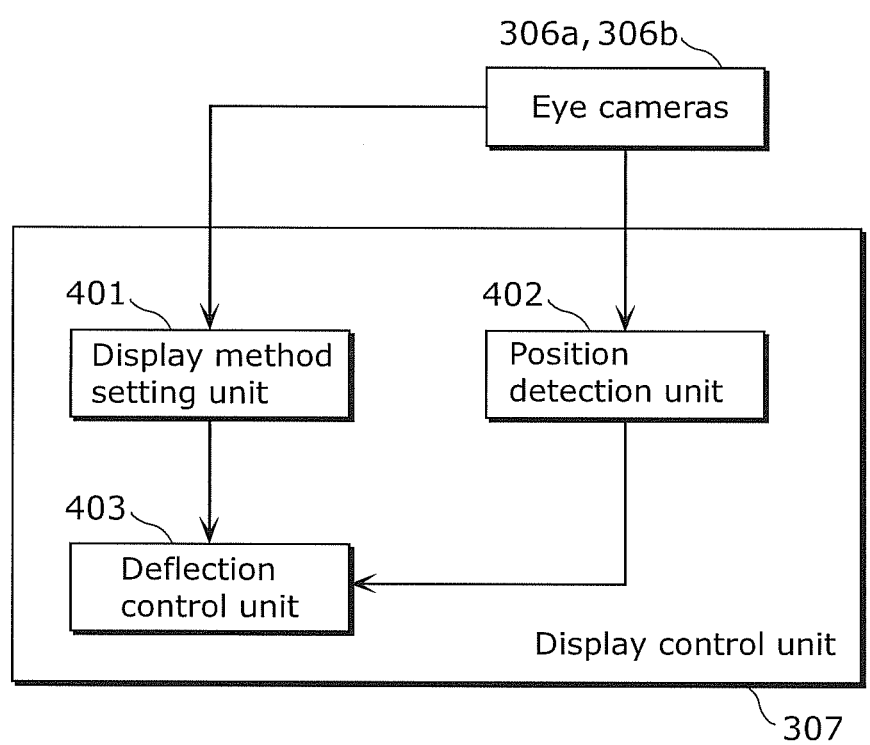
FIG. 4 is an exemplary function block diagram of a display control unit in Embodiment 1 of the present invention.

FIG. 4 is a function block diagram of the display control unit 307 according to Embodiment 1.

The display method setting unit 401 sets a display method to apply to each user when there are plural users at the same time. Specific operation of the display method setting unit 401 will be described in detail later.

The position detection unit 402 detects positions of a right eye 304a and a left eye 304b of the user 304 relative to the liquid crystal display device 303, based on the captured images provided by the eye cameras 306a and 306b. For example, the position detection unit 402 detects the positions, based on two images: one image provided by the eye camera 306a, and the other image provided by the eye camera 306b.

The deflection control unit 403 performs the following operation. The deflection control unit 403 uses information on the positions of the two eyes of the user 304 which the position detection unit 402 has detected based on the images captured by the two eye cameras 306a and 306b. Specifically, the deflection control unit 403 uses the information to cause the light deflection unit 302 to deflect the illumination light 305 emitted from the light source 301 (see FIG. 3) in a direction such that the deflected illumination light 305 enters the right eye 304a as light 305a for a predetermined period of time.

After the predetermined period of time, the deflection control unit 403 causes the light deflection unit 403 to deflect the illumination light 305 in a direction such that the deflected illumination light 305 enters the left eye 304b as light 305b.

The liquid crystal display panel 303 (see FIG. 3) is provided between the light deflection unit 302 and the user 304. Images are formed on the liquid crystal panel 303 by the light which exits the light deflection unit 302 and with which the liquid crystal display panel 303 is illuminated.

A right-eye image is set on the liquid crystal display panel 303 while the light 305 is deflected to converge as the light 305a onto the right eye 304a. A left-eye image is set on the liquid crystal display panel 303 while the light 305 is deflected to converge as the light 305b onto the left eye 304b. This allows the user 304 to view a 3D image.

Figure 5:
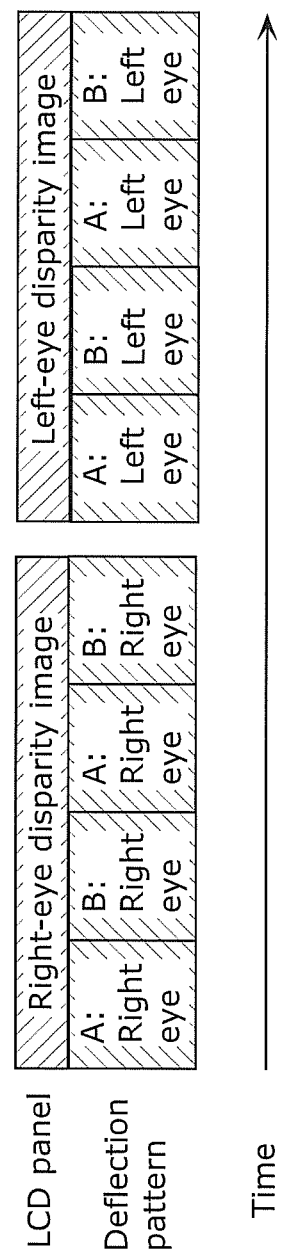
FIG. 5 illustrates an exemplary pattern of light deflection toward two users.

Furthermore, when plural users are using the liquid crystal display device according to Embodiment 1, the liquid crystal display device deflects light toward each detected eye of the users so that the light converges onto each of the eyes. Each appropriate image is displayed on the liquid crystal display panel with proper timing, so that all of the plural users can view a 3D image. The display device thus functions as a 3D display device not only for a single user but also for plural users. FIG. 5 illustrates an example for the technique.

FIG. 5 illustrates an example of the operation.

The lowest row of the three rows in FIG. 5 represents a temporal axis. As the arrow at the right end of the temporal axis shows, the item closer to the right end is newer in FIG. 5. The uppermost row represents whether the image displayed on the liquid crystal display panel 303 is a right-eye image or a left-eye image at each point of time on the temporal axis. The middle row represents which eye of a right eye and a left eye of which user between users A and B the light is deflected toward at each point of time on the temporal axis.

As illustrated in FIG. 5, the light deflection unit 302 deflects the illumination light 305 alternately toward the right eye of the user A and the right eye of the user B while the liquid crystal display panel 303 is displaying a right-eye image. Similarly, as illustrated in FIG. 5, the light deflection unit 302 deflects the illumination light 305 alternately toward the left eye of the user A and the left eye of the user B while the liquid crystal display panel 303 is displaying a left-eye image. A 3D image is thereby displayed to both of the users A and B through this processing.

However, there may be a problem with the case where confidential information (for example, see an image 612 in FIG. 6, which will be described later) is displayed on the liquid crystal display device 300 to plural users.

Figure 6:
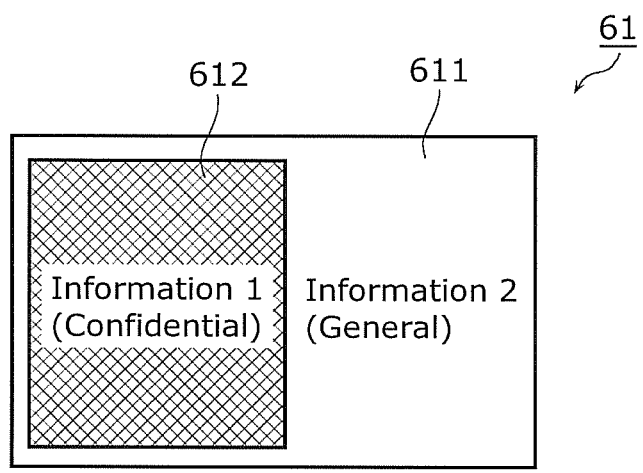
FIG. 6 illustrates an example of information items which are at different access levels concurrently on a display.

FIG. 6 illustrates an example of display of confidential information.

The words in FIG. 6 which read "Confidential" and "General" indicate an access level of each information item.

In Embodiment 1, confidential information is information which only limited users are allowed to view, and general information is information which all users are allowed view.

Assume that the liquid crystal display device 300 is displaying information as illustrated in FIG. 6 and that one user who is allowed to access confidential information (for example, the user A) and another user who is not allowed to access confidential information (for example, the user B) are looking at the display at the same time.

When the liquid crystal display device 300 defects light forming images to both of the users looking at the light deflection unit 302, an undesirable situation can be avoided. Specifically, it is possible to avoid a situation that the liquid crystal display device 300 allows the other user (user B), who lacks a right to access confidential information to view confidential information (image 612).

To solve this problem, the display control unit 307 in Embodiment 1 performs display control to increase security of information to be displayed when plural users are looking at the liquid crystal display device 300 at the same time.

The following will describe a specific procedure for the display control unit 307 to increase security of information to be displayed.

Figure 7:
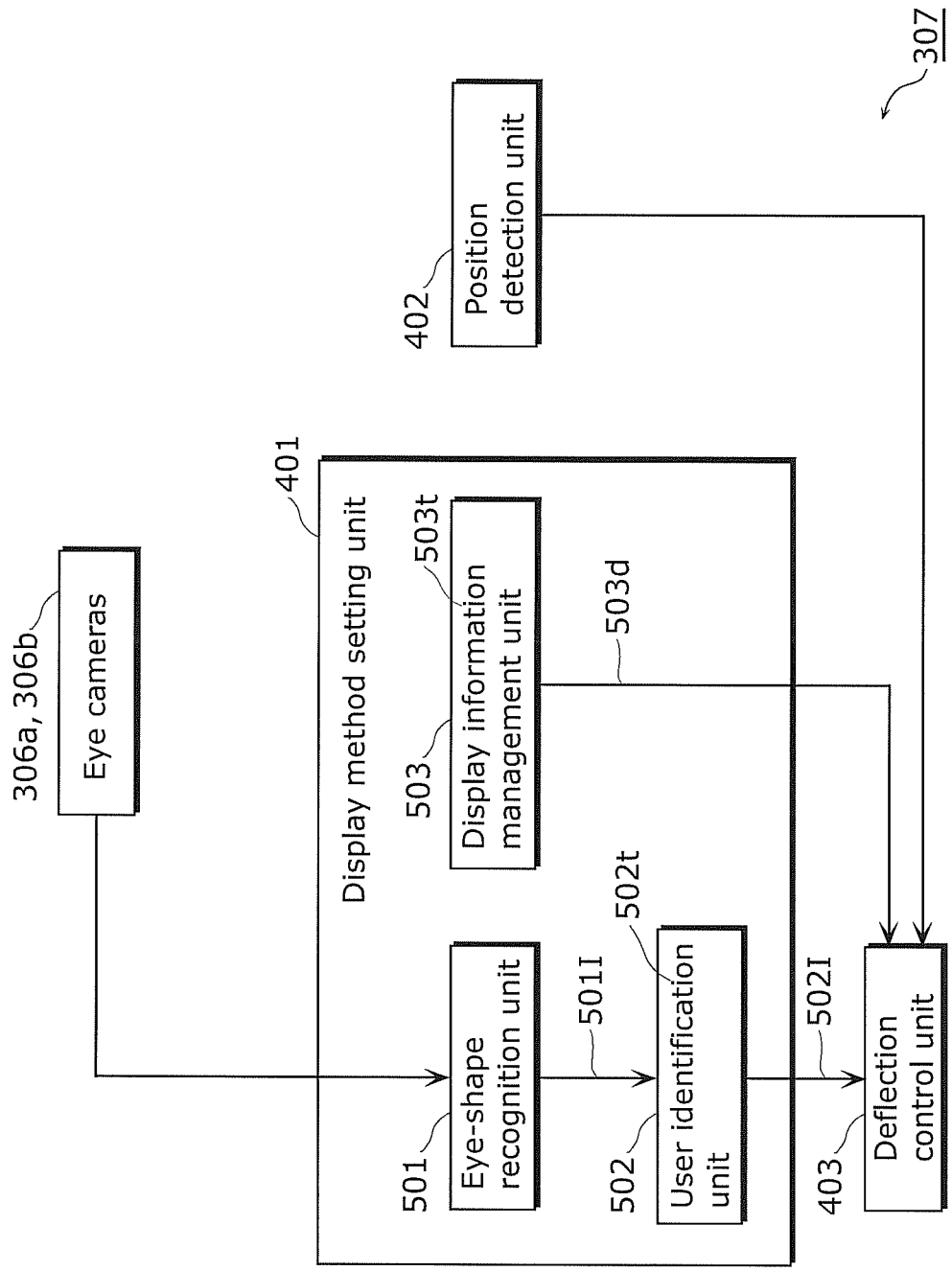
FIG. 7 is an exemplary function block diagram of a display method setting unit in Embodiment 1 of the present invention.

FIG. 7 is a function block diagram for a display method setting unit 401 (see FIG. 4) included in the display control unit 307 (see FIG. 3 and FIG. 4) in Embodiment 1. Each of the function blocks in FIG. 7 will be described in detail later.

Figure 8:
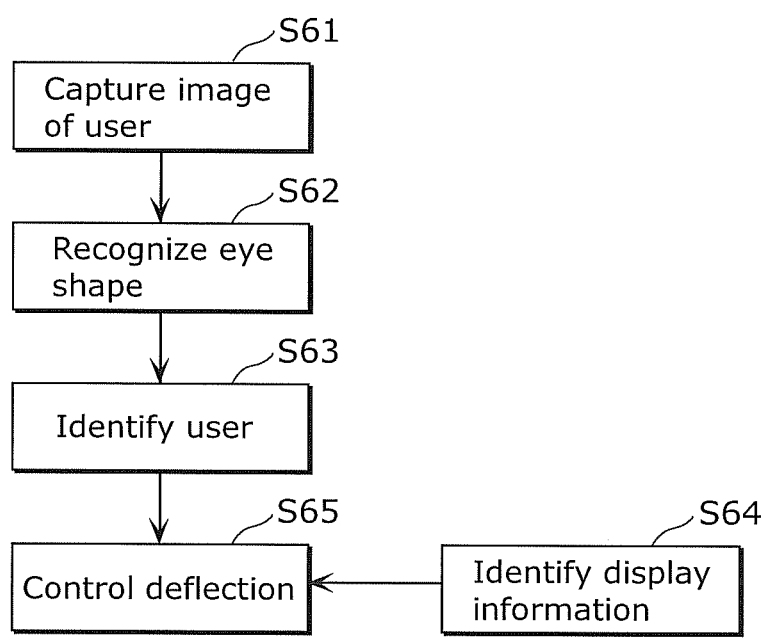
FIG. 8 illustrates a processing flow for control of directions of light deflection in Embodiment 1 of the present invention.

FIG. 8 illustrates a flow of processing to be performed by the display control unit 307.

Figure 9:
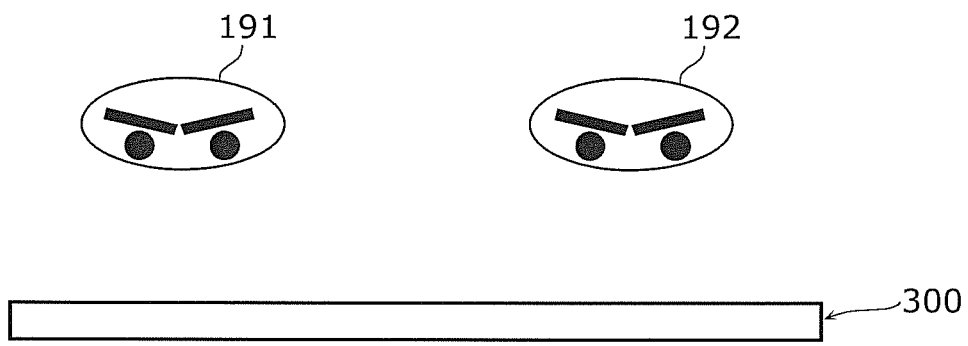
FIG. 9 illustrates two users.

FIG. 9 illustrates the liquid crystal display device 300 and two users 191 and 192 in Embodiment 1.

The display control unit 307 performs processes in Steps S61 to S65 illustrated in FIG. 8 to increase security of information to be displayed. For the sake of simplicity, the following will describes an exemplary case where the two users 191 and 192 are using the liquid crystal display device 300 at the same time as illustrated in FIG. 9.

(Step S61: Capturing Images of Users)

In Step S61, the eye cameras 306a and 306b each capture an image of eyes of the user 304 (two users 191 and 192).

As described above, the position detection unit 402 uses the two captured images of the user 304 for position detection. For example, the two images to be used by the position detection unit 402 are captured in Step S61.

Figure 10:
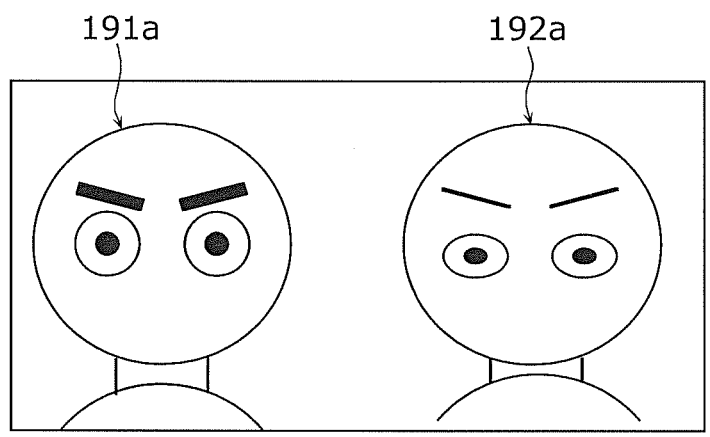
FIG. 10 illustrates an example of an image of users captured by an eye camera.

FIG. 10 illustrates an example of the captured images in Embodiment 1.

FIG. 10 illustrates an image captured by the eye camera 306a. The captured image includes face images of the two users 191 and 192 (images 191a and 192a) captured at the same time. Each of the eye cameras 306a and 306b provides an eye-shape recognition unit 501 (see FIG. 7) with the captured image.

In the exemplary case for Embodiment 1, the images of the plural users are captured in a single picture as illustrated in FIG. 10. Optionally, an image of each user may be captured separately. For example, the eye cameras 306a and 306b may capture images of the users 191 and 192, respectively. Alternatively, the eye cameras 306a and 306b may be configured to be capable of changing shooting directions so that images of the users 191 and 192 are captured with the eye cameras set in different directions. In this case, one picture includes an image of only one user, which facilitates recognition of faces of users.

(Step S62: Recognizing Shapes of Eyes (Generating Authentication Data))

In Step S62, the eye-shape recognition unit 501 generates authentication data from the captured images of the users obtained in above-described Step 61. The authentication data is necessary for user authentication. For illustrative purposes, the following will describe in detail a case where authentication data is generated from only one of the two captured images which are obtained in Step S61 and to be used by the position detection unit 402. It should be noted that authentication data may be generated from, for example, both of the two captured images which will be described in detail later.

In Embodiment 1, an image of eyes of users is used for user authentication. For this purpose, the eye-shape recognition unit 501 extracts contours of the users 191 and 192 (contours 191b and 192b in FIG. 11, which will be described later) from an image captured by an eye camera (for example, the image captured by the eye camera 306a illustrated in FIG. 10). After the extracting, the eye-shape recognition unit 501 recognizes eyes within the extracted contours of the users, and generates eye-image data for the user 191 and eye-image data for the user 192 (see FIG. 12, which will be described later).

Figure 11:
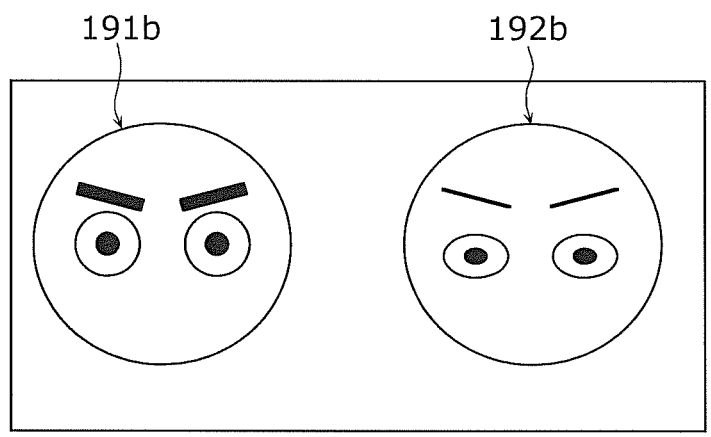
FIG. 11 illustrates an example of contours of the users extracted from the image captured by the eye camera.

FIG. 11 illustrates a result of the extraction of contours of users from a captured image provided from an eye camera. The shapes of the contours of the users 191 and 192 are recognized, and data for facial parts of the users (contours 191b and 192b) is extracted as illustrated in FIG. 11.

Figure 12:
FIG. 12 illustrates an example of eye images of the users extracted from the image captured by the eye camera.

FIG. 12 illustrates an example of extracted eye images of the users from the contours of the users illustrated in FIG. 11.

Eye-image data 901 and eye-image data 902 (information 5011 in FIG. 7) are generated for the users 191 and 192, respectively, as illustrated in FIG. 12.

The eye-shape recognition unit 501 provides a user identification unit 502 with the generated authentication data (information 5011 in FIG. 7).

(Step S63: Identifying Users)

In Step S63, the user identification unit 502 uses the authentication data generated in preceding Step S62 for user authentication to determine which information item each user is allowed to access.

In Embodiment 1, the user identification unit 502 holds information for identification of each user based on eye-image data in a user management table (see FIG. 13 for an example), which will be described later. The user identification unit 502 uses the table for user authentication.

Figure 13:
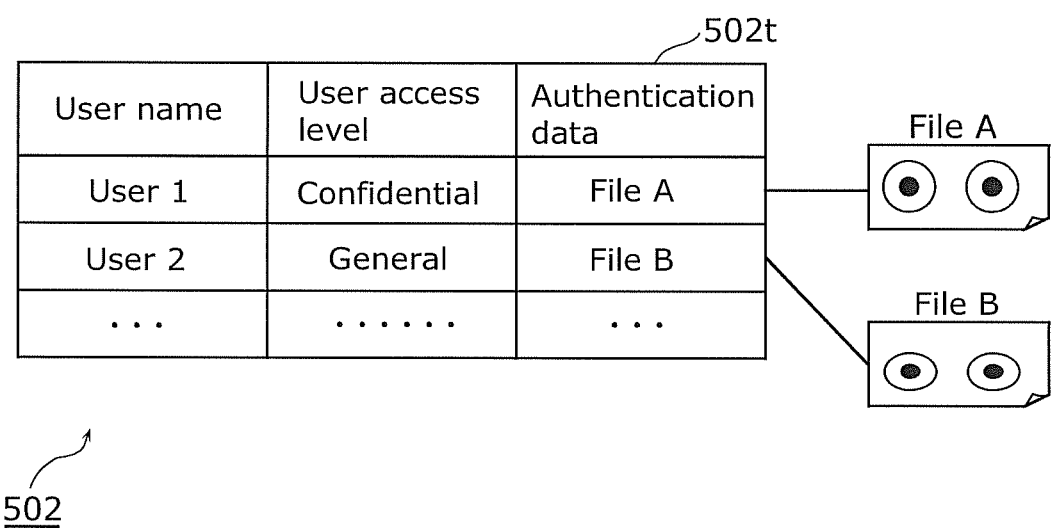
FIG. 13 illustrates an example of an information management table for user authentication.

FIG. 13 illustrates an example of the user management table (table 502t) in Embodiment 1.

As illustrated in FIG. 13, the user management table stores user names of users registered in the liquid crystal display device 300 (Column 1), information on user access levels for individual users (Column 2), and authentication data for user authentication (Column 3).

In Embodiment 1, the eye-image data is used as the authentication data. Accordingly, the column for the authentication data of users in the user management table illustrated in FIG. 13 (Column 3) contains image file names for authentication of the individual users (File A and File B in FIG. 13).

The user identification unit 502 compares the eye-image data provided by the eye-shape recognition unit 501 (see FIG. 12) and eye-image files having the image file names stored in the user management table (see Column 3 in FIG. 13). When the comparison shows a match between eye-image data and an eye-image file, the user identification unit 502 proceeds to next identification. In the identification, a user looking at the liquid crystal display device 300 is identified as a user having a user name (in Column 1 in FIG. 13) registered in the user management table associated with the file name (in Column 3) of the eye-image file.

In the example illustrated in FIG. 12 and FIG. 13, the eye-image data 901 for the user 191 (see FIG. 9) matches eye-image data registered as File A. The user 191 is therefore identified as a user having a user name of User 1 (see Row 2, Column 1 in FIG. 13) and allowed to access confidential information (see Row 2, Column 2). Similarly, the user 192 is identified as a user having a user name of User 2 (see Row 3, Column 1) and allowed to access only general information (see Row 3, Column 2).

The user identification unit 502 provides the deflection control unit 403 with information on the user access level of each user (information 5021 in FIG. 7).

The authentication data in FIG. 13 (Column 3) may be file names as described above. In other words, eye-image data may be indirectly stored as in a table using file names as authentication data. Optionally, eye-image data may be directly stored in the table. In the latter case, that is, the case where eye-image data is directly stored in the table, faster user authentication is possible because it is unnecessary to search for eye-image data files.

(Step S64: Determining Display Information Items)

In Step S64, a display information management unit 503 (see FIG. 7) identifies information items displayed on the liquid crystal display panel 303 (see each row in FIG. 14). Furthermore, in Step S64, the display information management unit 503 retrieves an access level of each of the identified information items (see Column 2).

In Embodiment 1, the display information management unit 503 holds an information management table (table 503t in FIG. 14) for management of access levels and current display areas (see FIG. 6) of information items.

FIG. 14 illustrates an example of the information management table in Embodiment 1.

In the example illustrated in FIG. 14, the access level of Information 1 (in Row 2) is set at confidential (see Row 2, Column 2).

In the example illustrated in FIG. 14, display areas (in Column 3) is represented using coordinates in a coordinate system having its origin at the lower left corner of the display. In other words, a display area of an information item is represented using coordinates of the lower left and the upper right of the display area in the coordinate system. The coordinate values represent length in units of pixels of the liquid crystal display panel. For information items currently not displayed, there is no information on the display area as illustrated in the row of Information 3 (in Row 4), and therefore the cell (Row 4, Column 3) is empty.

The display information management unit 503 extracts data on information items currently on the display from the information management table 503t, and provides the deflection control unit 403 with the extracted data (data 503d in FIG. 7). For example, the display information management unit 503 extracts, from the table 503t illustrated in FIG. 14, data (in Row 2, Columns 2 and 3) associated with the image 612 in FIG. 6 (for example, Information 1) and data (in Row 3, Columns 2 and 3) associated with the image 611 (for example, Information 2) and provides the deflection control unit 403 with them.

The display area, represented using the set of coordinates of the lower left and the upper right of the display area, may be represented otherwise. Such information on a display area may be stored only for information items which need to be displayed with restriction (confidential information in the example for Embodiment 1). In this case, data size of the information management table and frequency of updating of information on display areas can be reduced.

(Step S65: Controlling Deflection)

In Step S65, a process is performed on the basis of the information on user access levels for individual users (Column 2 in FIG. 13) obtained in above-described Step S63, and the information on the access levels of the individual identified information items (Column 2 in FIG. 14), and the information on display areas (Column 3 in FIG. 14) extracted in above-described Step S64. In this process, the deflection control unit 403 controls deflecting directions of illumination light 305 (see FIG. 3) for display of each of the information items on the liquid crystal display device 300 on the basis of the set of the information.

In Embodiment 1, the deflection control unit 403 controls deflecting directions of illumination light depending on the positions of the individual users detected by the position detection unit 402.

Furthermore, the deflection control unit 403 controls directions of deflection of illumination light so that the illumination light is deflected toward the users alternately as illustrated in above-described FIG. 5.

At this time, the deflection control unit 403 controls the light deflection so that illumination light forming an information item at an access level of "Confidential" is not deflected toward a user having the user access level of "General".

Figure 15:
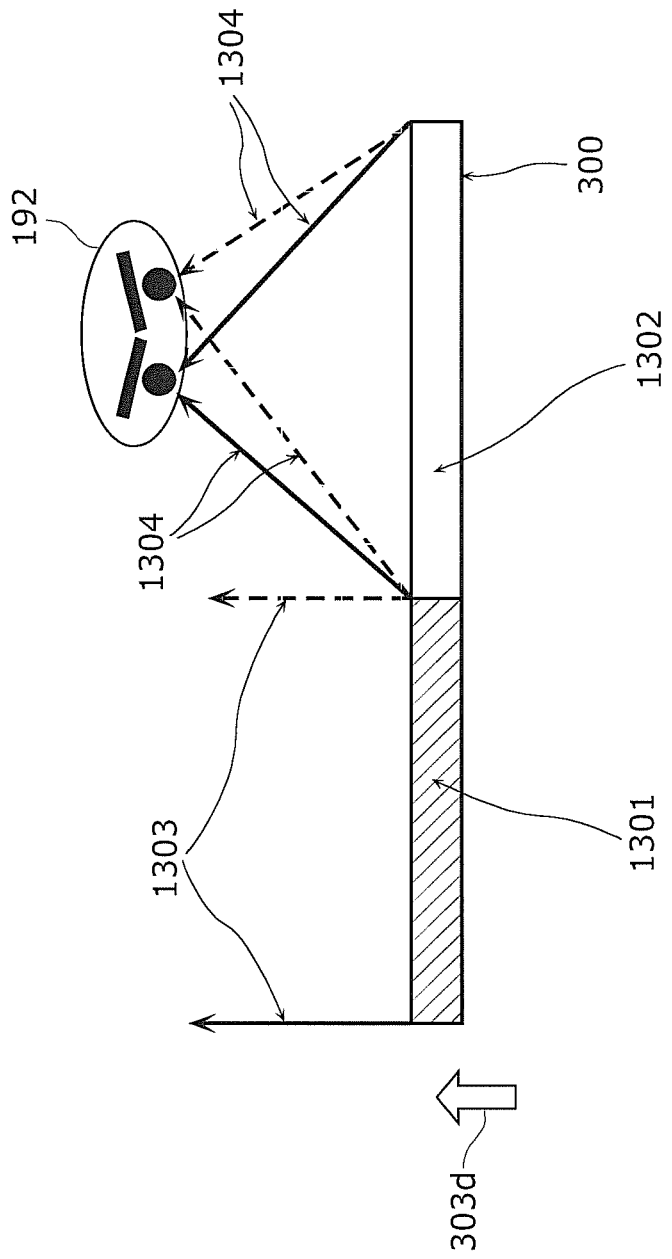
FIG. 15 illustrates an example of light deflection toward a user having a lower user access level.

FIG. 15 illustrates an example of light deflection for a user having the user access level of "General".

In FIG. 15, a region 1301 of the liquid crystal display panel 303 is a part where confidential information is displayed (see FIG. 3 for an example). The region 1301 is illuminated with illumination light 1303. As illustrated in FIG. 15, the reference sign 1303 has two leader lines. The illumination light 1303 in the region 1301 is schematically illustrated by two arrows indicated by the two leader lines. The illumination light 1303 is deflected in a direction 303d which is a direction other than a direction toward the eyes of the user 192 so that the illumination light 1303 does not enter the eyes. In the example illustrated in FIG. 15, the other direction 303d is perpendicular to a display surface of the liquid crystal display panel 303 (see the direction 303d in FIG. 15). The eye positions of the user 192 may be at positions in directions perpendicular to the region 1301. In this case, for example, the other direction 303d may be a direction not perpendicular to the display surface of the liquid crystal display panel 303.

Figure 16:
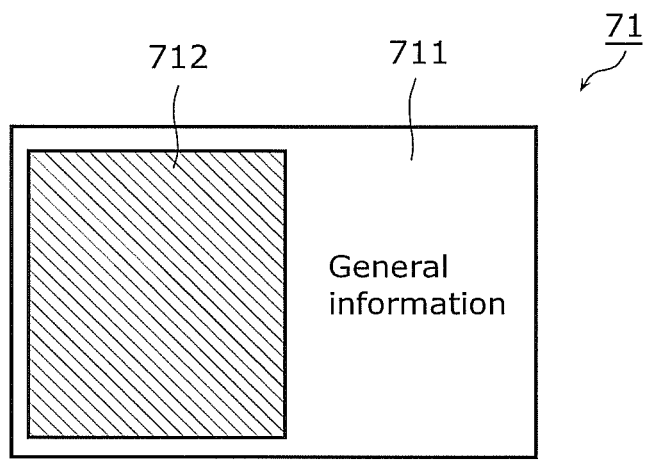
FIG. 16 illustrates an example of display of information shown to a user having a lower user access level.

In FIG. 15, a region 1302 is a region where information item at an access level of "General" is displayed. Illumination light 1304 with which the region 1302 is illuminated is deflected so as to enter the eyes of the user 192. FIG. 16 illustrates an example of a display image to be viewed by the user 192 in this example.

FIG. 16 illustrates that a part containing the confidential information in FIG. 6 (a part 712) does not show the confidential information to the user 192. An image 71 to be recognized by the user 192 thus shows the user 192 not the part 712 containing the confidential information item but only a part 711 containing general information. For example, the part 712 containing the confidential information item may be recognized as a black region by the user 912.

Figure 17:
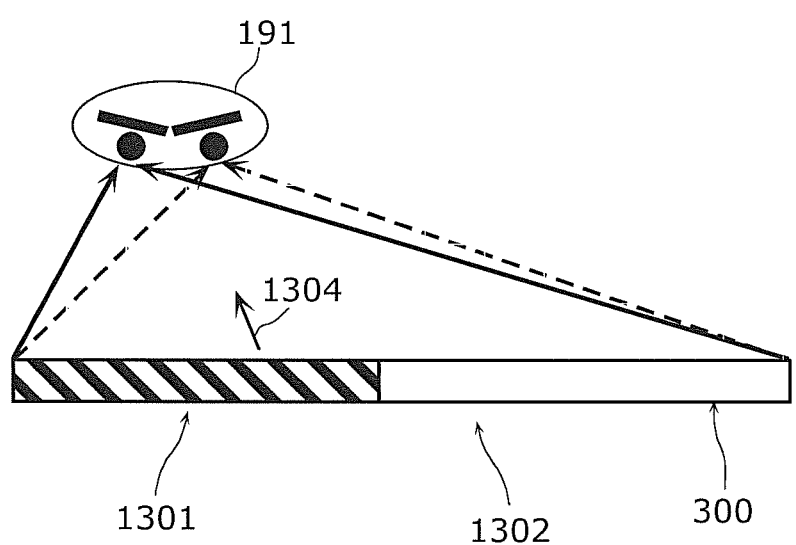
FIG. 17 illustrates an example of light deflection toward a user having a higher user access level.

FIG. 17 illustrates an example of light deflection for a user 191 having a user access level of confidential information.

As illustrated in this example, light forming an image across the display panel is deflected so as to enter the eyes of the user 191. Both light forming the image in the region 1301 and light forming the image in the region 1302 thereby enters the eyes of the user 191. As a result, the user 191 is allowed to view all information items including the confidential information item (the image 612) illustrated in FIG. 6.

The processes from Steps S61 through S65 are thus performed so that security in displaying information on the liquid crystal display device 300 can be increased even when plural users are looking at the liquid crystal display device 300.

For simplicity of description, the number of users using the liquid crystal display device 300 is two in the examples in Embodiment 1. It should be noted that security of information can be secured by the same processing also in the case where three or more users are using the liquid crystal display device 300.

For simplicity of description, the display control is performed using the image captured by the eye camera 306a illustrated in FIG. 10 in the examples in Embodiment 1. It should be noted that users may be identified based on authentication data generated from two images captured by the eye camera 306a and the eye camera 306b. This enables more accurate user authentication.

In Embodiment 1, user authentication may be performed using data other than eye-image data as data for user authentication. For example, data on contour or face of users illustrated in FIG. 11 may be used as data for user authentication. This enables more detailed examination of characteristics of users so that more accurate user authentication is possible. It is also possible to authenticate users using data other than face images. For example, user authentication may be performed on users wearing glasses, a headset, or the like which is a signaling device to emit a signal, such as an infrared signal, for authentication. This enables more accurate user authentication. It is also possible to authenticate a user by recognizing an identification part which emits no signal but has, for example, a QR code on glasses or the like using an eye camera (QR code is a registered trademark). In this case, user authentication is possible without providing any extra device on the glasses or the like.

The access levels of information items, the two of "Confidential" and "General" in the examples in Embodiment 1, may be segmentalized into more levels and may be set for each user. This further increases security of the display device.

The liquid crystal display panel 303 may display not only a mixture of confidential information and general information as illustrated in FIG. 6 in the examples in Embodiment 1 but also confidential information or general information only at a time. In this case, it is no longer necessary to manage display areas for individual information items, so that processing cost for display control can be reduced.

The processes in Steps S61 to S63 and the process in Step S64 may be performed in the reverse order or concurrently.

The detection of the positions of right and left eyes by the position detection unit 402 is performed using two cameras in Embodiment 1. It is not to mention that this can be performed using other means. The method of detecting eye positions is not limited to the examples in Embodiment 1.

As described above, a device for control of refraction index by application of a voltage can be used as the light deflection unit 302. In this case, for example, the light source emits, as the light 305, red laser light having a wavelength of 640 nm, green laser light having a wavelength of 532 nm, and blue laser light having a wavelength of 450 nm. The three types of laser light is emitted in turn and the refractive index of the light deflection unit 302 is adjusted appropriately for the laser light being emitted at each point of time. This makes it possible to deflect the laser light in different colors toward the same position. It is thereby possible to provide a liquid crystal display device free from color misregistration.

Figure 18:
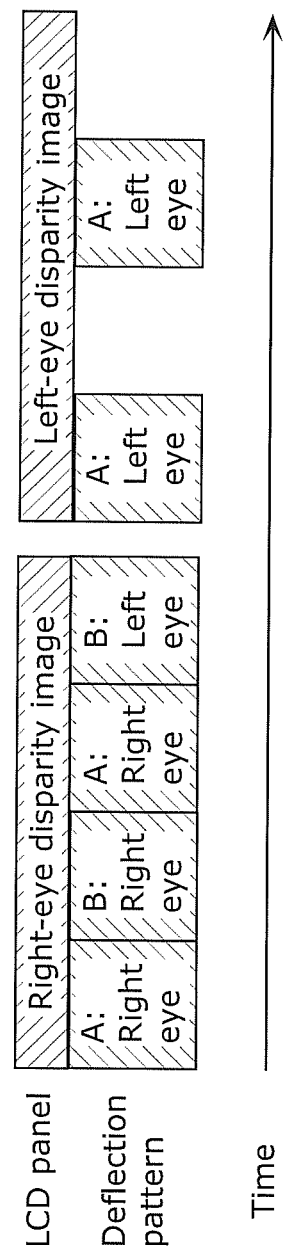
FIG. 18 illustrates an exemplary pattern of light deflection toward two users.

FIG. 18 illustrates an example of control using the technique.

In the examples in Embodiment 1, information items at different access levels are displayed to individual users on the basis of user authentication. It is also possible to use 2D display mode to one user and 3D display mode to another user on the basis of user authentication. For example, when two users A and B view images, there may be a case where an image is to be displayed to the user A in 3D mode and to the user B in 2D mode. In this case, the processes in Steps S61 to S63 in Embodiment 1 (see FIG. 8) are performed so that correspondence between plural eye positions and the users can be obtained. This is followed by control of the light deflection unit 302 as illustrated in FIG. 18, so that it is possible to display the image to the user A in 3D mode and to the user B in 2D mode.

The deflection pattern illustrated in FIG. 18 is merely an example, and use of 2D mode for one user and 3D mode for another user may be achieved by the other deflection pattern. For example, when light is deflected toward the user A for a longer time, the user A can see an image having higher brightness.

It is also possible to measure eye positions of users using a method other than the stereo camera (the two eye cameras 306a and 306b) in Embodiment 1. For example, the eye cameras 306a and 306b may be infrared cameras. The light source 301 emits infrared in addition to RGB light. The infrared is deflected toward users and infrared reflected from the eyes of the users are measured using the infrared cameras so that the eye positions of the users can be measured. In this case, eye positions of users can be measured even in a place where brightness is insufficient. Another possible method is that eye positions of users are estimated by measuring infrared emitted from a glasses-type infrared generation device provided at the positions of the eye of the user. This enables more accurate estimation of eye positions of users.

Although the number of users are two in the examples described in Embodiment 1, this technique is also applicable to the case where there are three or more users. For example, when users A and B having a higher user access level and a user C having a lower user access level are looking at a display device, an information item may be displayed only to the users A and B. In this case, even highly confidential information can be shared by plural users.

It is thereby possible to detect a position of a user (see the user 304 in FIG. 3).

Specifically, the position to be detected is a position of an eye of the user (for example, see the position of the right eye 304a).

Light forming an image (for example, the image 612 in FIG. 6) may be deflected toward the detected position.

There may be not only a first user (the user 191 in FIG. 17 or the user 1 in FIG. 13) but also a second user (the user 192 or the user 2) (for example, see FIG. 9).

It is assumed in this case that an image (for example, the image 612) is to be viewed only by the first user and it is inappropriate that the second user is allowed to view the image.

In this case, a determination may be made as to whether the detected position is a position of the first user or a position of the second user.

The light (for example, the light 1304 in FIG. 17) forming the image (for example, the image 612 in FIG. 6) is deflected toward the detected position only when it is determined that the detected position is a position of the first user, and not deflected toward the detected position when it is determined that the detected position is a position of the second user (see the light 1303 in FIG. 15). In other words, the light is deflected in the direction 303d other than a direction toward the user (see FIG. 15) when it is determined that the detected position is a position of the second user. The deflection control unit 403 may perform control for such a way of deflection.

This makes it possible to prevent light from entering inappropriate position as a result of deflection of light toward the position determined as a position of the second user, so that light enters an appropriate position.

The position to be detected as a position of a user may be only a position of a predetermined one of right and left eyes of a user.

The above-mentioned image may be an image which is included in a 3D image and is to be displayed to the predetermined one of the eyes. In this case, the first user is allowed to view the 3D image, and the second user is allowed to view an image (for example, a 3D image) other than the 3D image displayed to the first user.

Another possible case is that only the first user has a right to access the image and the second user does not, or that the only the first user is an authenticated user allowed to see the image and the second user is not.

The above-mentioned image may be a second image (see the image 612 in FIG. 6) which is included in an entire image (the image 61) together with a first image (the image 611) (see FIG. 12).

For example, the first image is the image of the region containing general information and the second image is the cross-hatched image 612 of the region containing confidential information in FIG. 6.

In other words, the first user is allowed to view not only the first image but also the second image, while the second user is allowed to view only the first image but not the second image (see FIG. 16).

Embodiment 2

Embodiment 2: Storing Eye-Position History

A configuration of a liquid crystal display device 1701 capable of showing 3D images using light deflection elements and (see FIG. 19, for example) will be described in Embodiment 2. In the configuration, the liquid crystal display device 1701 determines eye positions of users in a simple way.

Figure 19:
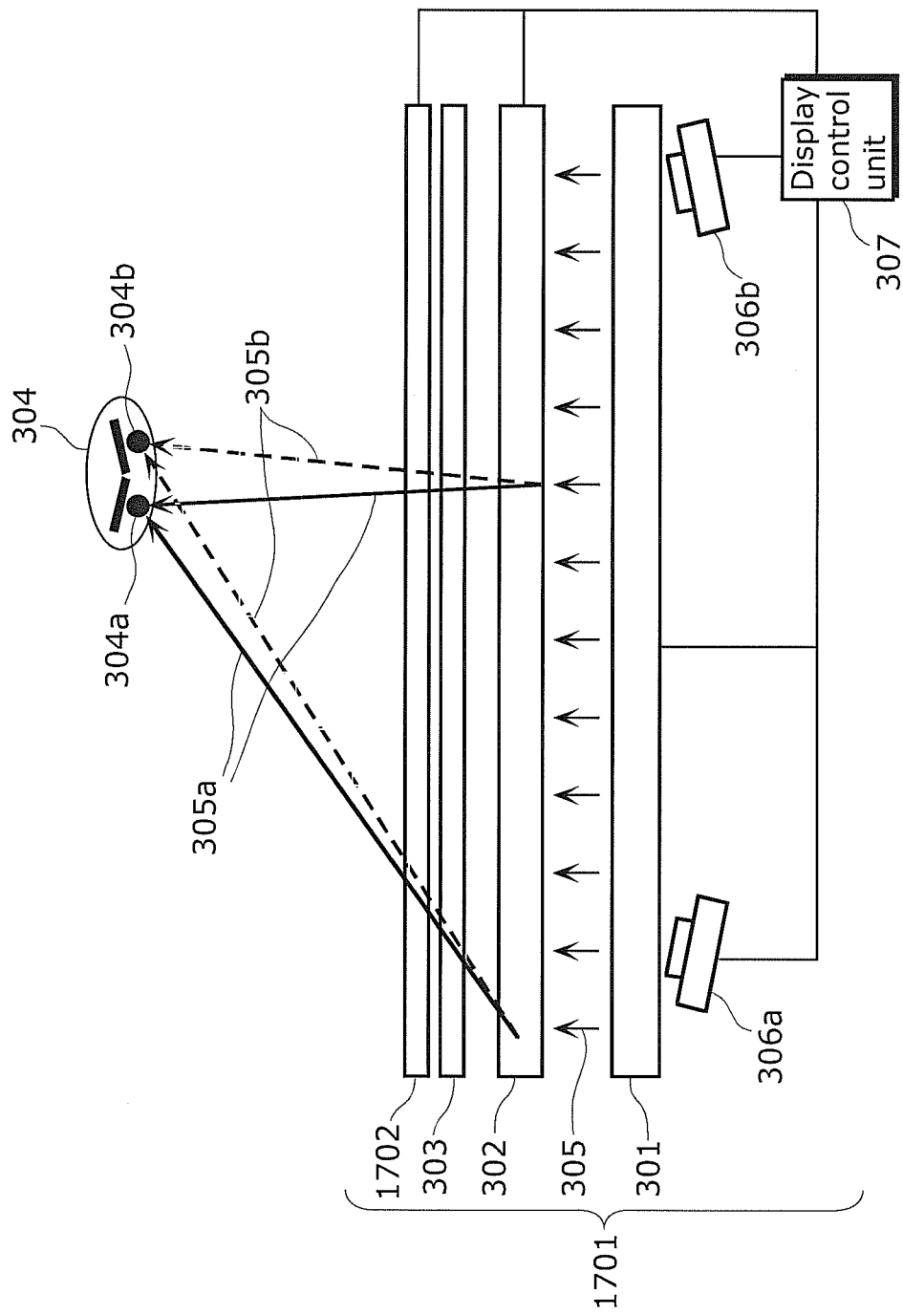
FIG. 19 illustrates an exemplary configuration of a liquid crystal display device in Embodiment 2 of the present invention.

FIG. 19 illustrates a configuration of the liquid crystal display device 1701 according to Embodiment 2.

Constituent elements equal to those in Embodiment 1 are referred to with the same reference signs, and thus detailed description thereof is omitted as appropriate.

In Embodiment 2, the liquid crystal display device 1701 includes a terminal state obtainment unit 1702. The terminal state obtainment unit 1702 includes a touch sensor and an inclination sensor. The touch sensor detects a position of a touch given by a user 304 onto a screen (a liquid crystal display panel 303) of a terminal (the liquid crystal display device 1701). The inclination sensor detects an inclination angle of the liquid crystal display device 300 with respect to a horizontal plane. The terminal state obtainment unit 1702 uses the sensors to obtain a state of the liquid crystal display device 1701 in use. In Embodiment 2, the touch sensor is disposed on the liquid crystal display panel 303 and serves as a touch panel to provide the user 304 with an input functionality.

Figure 20:
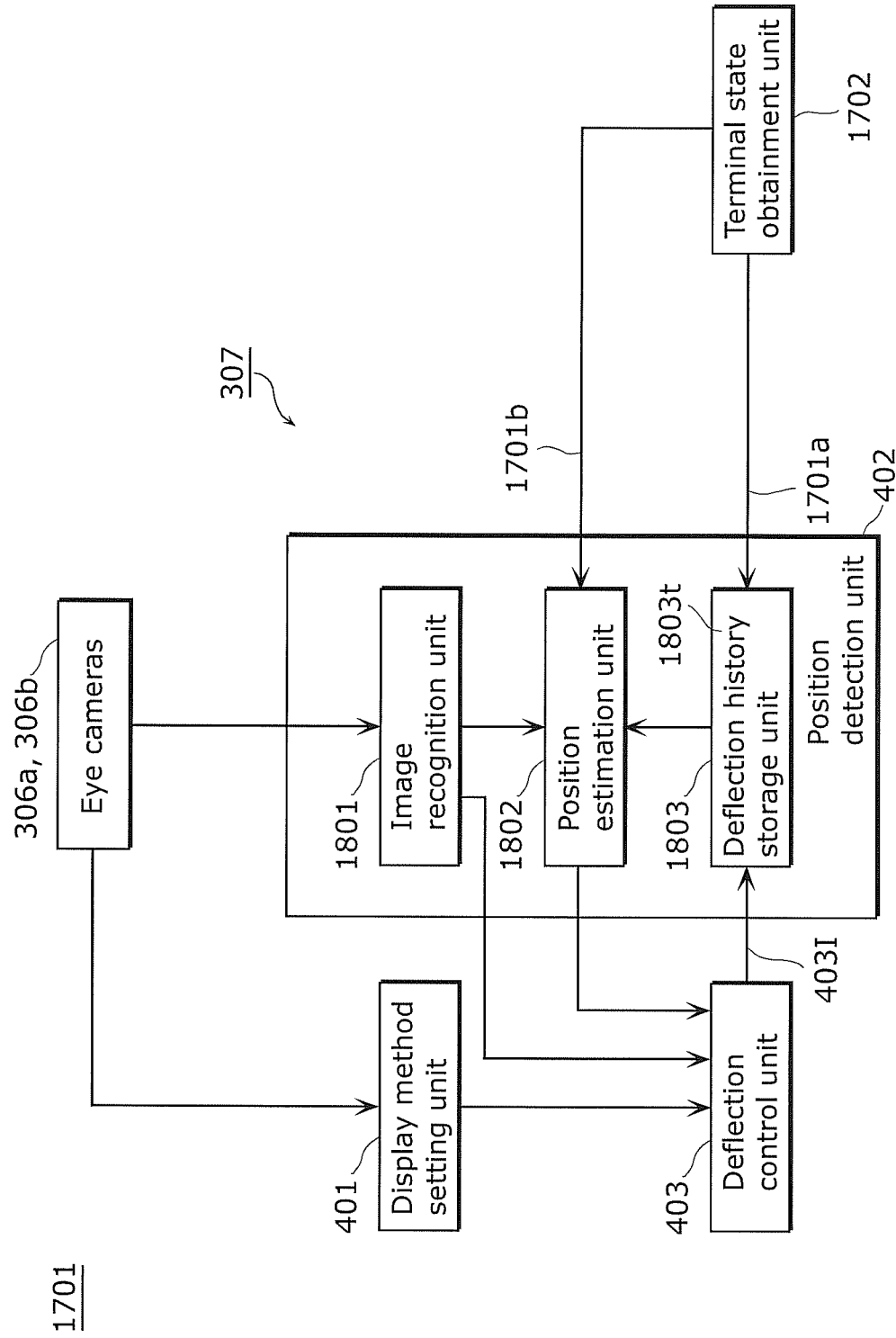
FIG. 20 is an exemplary function block diagram of a position detection unit in Embodiment 2 of the present invention.

FIG. 20 is a function block diagram of a position detection unit 402 (see FIG. 4) in Embodiment 2.

A function of the display control unit 307 according to Embodiment 2 is described using the same set of blocks as the one in Embodiment 1 illustrated in FIG. 4. Furthermore, in Embodiment 2, the position detection unit 402 has a function of simple detection of eye positions of users. The function of the position detection unit 402 is described using a set of blocks illustrated in FIG. 20. Each of the function blocks 1801 to 1803 in FIG. 20 will be described in detail later.

As with Embodiment 1, the liquid crystal display device 1701 according to Embodiment 2 detects eye positions of users using eye cameras 306a and 307b. Then, the light deflection unit 302 deflects the illumination light 305 on the basis of the detected positions to display a 3D image.

However, such detection of eye positions of users using the eye cameras 306a and 306b may be difficult when the liquid crystal display device 1701 is used in a dark place or either or both of the eye cameras 306a and 306b is out of order. When the liquid crystal display device 1701 fails to detect the eye positions of users, it is impossible to cause the illumination light 305 to enter the eyes of the users. As a result, information cannot be displayed to the users.

The position detection unit 402 according to Embodiment 2 includes a deflection history storage unit 1803 (see FIG. 20) to avoid such situation. The deflection history storage unit 1803 holds a deflection history management table (table 1803t) and stores a deflecting direction in which the light deflection unit 302 has deflected light (see information 403I) and information received from the terminal state obtainment unit 1702 (information 1701a) in association with each other in the deflection history management table.

FIG. 21 illustrates an example of the deflection history management table (table 1803t) held in the deflection history storage unit 1803.

In Embodiment 2, history of deflection of illumination light by the light deflection unit 302 (see FIG. 19) is stored as angles in the following manner. The light deflection unit 302 deflects light incident on the center of the liquid crystal display panel 303 perpendicularly to the display surface of the liquid crystal display panel 303 in a direction not perpendicular to the display surface so as to cause the light to enter a right eye or a left eye of a user. The angle between the direction of the light before the deflection and the direction of the light after the deflection is stored as a record in the history.

FIG. 21 illustrates an example in which the history includes a record indicating that for User 1 (in Row 2), illumination light is deflect to the right at an angle of 15 degrees to cause the illumination light to enter a right eye of User 1 (Row 2, Column 2). The history also includes a record indicating that illumination light is deflect to the left at an angle of 15 degrees to cause the illumination light to enter a left eye of User 1 (Row 2, Column 3).

The data received from the terminal state obtainment unit 1702 is stored as information items of right-hand position (Column 4), left-hand position (Column 5), and terminal inclination (Column 6). The right-hand position and left-hand position are represented using coordinates in a coordinate system having its origin at the lower left corner of the liquid crystal display panel 303. The coordinate values represent length in units of pixels of the liquid crystal display panel.

In the case of User 1 (see Row 2) in FIG. 21, the record indicates that when a 3D image is displayed, the right hand of the user 304 touched a point 1000 pixels distant from the lower left corner of the display to the right and 500 pixels to the above (see Row 2, Column 4). The record also indicates that the left hand touched a point 500 pixels distant from the lower left corner of the display to the above (see Column 5). The terminal inclination (see Row 2, Column 6) indicates the user 304 viewed information displayed on the liquid crystal display device 1701 inclined at an angle of 20 degrees with respect to a horizontal plane. Generally, it is considered that the viewing distance from a user to the liquid crystal display device 1701 included in a display apparatus (such as a tablet, a personal computer display, or a television set) used by the user on a daily basis does not vary greatly. Thus, information on such viewing distances stored as history records makes it possible to estimate a positional relation between the user 304 and the liquid crystal display device 1701 even when the eye cameras does not function sufficiently.

In Embodiment 2, the deflection history storage unit 1803 may use a method of recoding information on deflection different from the above-described method in which deflection angles of light incident on a pixel at the center of the liquid crystal display panel 303 is stored as information on deflection by the light deflection unit 302. For example, the deflection history storage unit 1803 may record, as information on deflection, deflection angles at which light incident on a pixel at the right edge of the screen need to be deflected so as to enter an eye of the user 304. Alternatively, the deflection history storage unit 1803 may store, as information on deflection, deflection angles at which light incident on plural pixels of the screen need to be deflected so as to enter an eye of the user 304. This enables more accurate estimation of eye positions of users.

Examples of the method of estimating eye positions of users include a method in which the information received from the terminal state obtainment unit 1702 indicates only one of the right-hand position and the left-hand position and a method in which the information items are represented using something other than coordinates in a coordinate system having its origin at the lower left corner of the screen. For example, the information may be represented using a coordinate system having its origin at the center of the liquid crystal display panel 303.

In Embodiment 2, the position detection unit 402 uses information under the management of the deflection history storage unit 1803. This makes it possible to estimate eye positions of a user even when it is impossible to detect the positions using the eye cameras 306a and 306b due to, for example, malfunction as mentioned above. Accordingly, 3D images can be uninterruptedly displayed. The following specifically describes the processing for the estimation.

Figure 22:
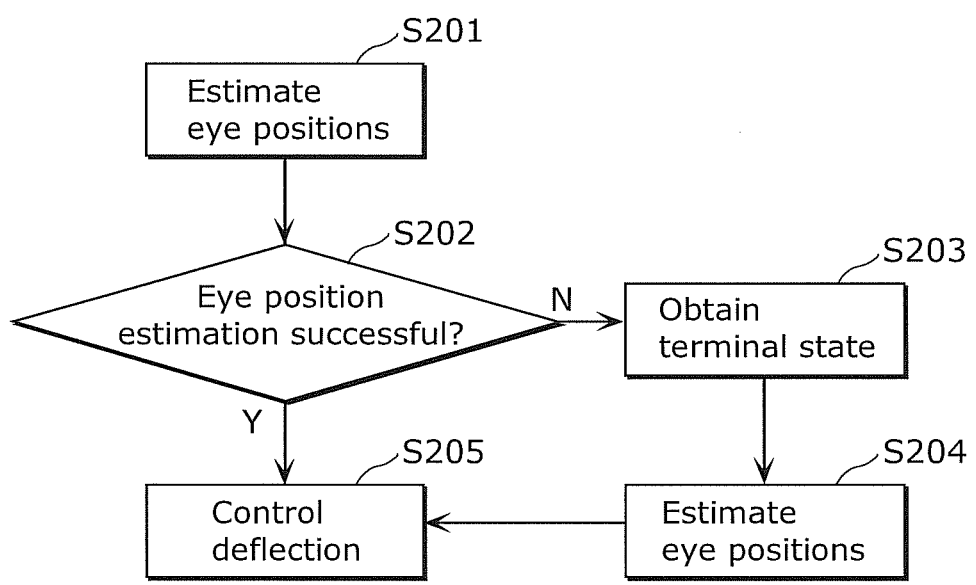
FIG. 22 illustrates an exemplary processing flow for detection of eye positions of a user in Embodiment 2 of the present invention.

FIG. 22 illustrates a processing flow for the estimation.

In Embodiment 2, the position detection unit 402 performs processes in Steps S201 to S204 illustrated in FIG. 22 to estimate eye positions of a user.

(Step S201)

In Step S201, an image recognition unit 1801 estimates eye positions of the user 304, based on two data items which are images of the eyes of the user 304 captured by the two eye cameras 306a and 306b. The eye cameras 306a and 306b are provided as a stereo camera as illustrated in FIG. 19. It is therefore possible to determine a distance of the user 304 from the liquid crystal display device 1701 and positions of the two eyes, a right eye 304a and a left eye 304b of the user 304, by comparing the two image provided by the two cameras.

The eye positions are thus estimated in Step S201. When this process is performed successfully, the eye positions are estimated. When this process turns out to be unsuccessful, the eye positions are not estimated. This will be described in detail later.

(Step S202)

In Step S202, it is determined whether or not the image recognition unit 1801 has detected eye positions of the user, that is, whether or not the process in S201 has turned out to be successful.

When there is no problem with the images provided by the stereo eye cameras 306a and 306b (S202, Y), the image recognition unit 1801 can estimate eye positions of the user. In this case, the deflection control unit 403 is notified of the result of the estimation.

When it is impossible to estimate eye positions of the user 304 from images provided by the eye cameras because of a problem such as abnormality in the eye cameras or insufficient ambient brightness (S202, N), the image recognition unit 1801 notifies a position estimation unit 1802 of the failure in estimation of eye positions, and then performs a process in Step S203.

(Step S203)

In Step S203, the position estimation unit 1802 obtains current terminal information (information 1701b in FIG. 20) from the terminal state obtainment unit 1702. In Embodiment 2, the position estimation unit 1802 obtains information on a position of a touch given by the user 304 onto the touch sensor of the terminal state obtainment unit 1702 and information on inclination of the liquid crystal display device 1701 with respect to a horizontal plane.

After obtaining the information from the terminal state obtainment unit 1702, the position estimation unit 1802 performs a process in Step S204.

(Step S204)

In Step 204, the position estimation unit 1802 searches for information under the management of the deflection history storage unit 1803 using the information on a state of the terminal obtained in the previous step, and estimates eye positions of the user 304.

In Embodiment 2, the position estimation unit 1802 searches the deflection history management table illustrated in FIG. 21 for a exact-match record or a closest-match record based on information on the user name of the user 304 currently using the terminal, information on positions of touches on the terminal, and information on inclination of the terminal.

For example, it is assumed that the information on the state of the terminal obtained in preceding Step S203 indicates a position of the right hand at a point (1000, 500), nothing for the left hand, terminal inclination at an angle of 20 degrees, and User 1 as the user name of the user 304. In this case, the record in the first row in FIG. 21 is determined as data corresponding to the obtained data and is to be used for estimation.

In Embodiment 2, a method of determining a user name may is not limited to a specific one. Examples of other possible methods includes a method in which a user is prompted to enter a user name when using the liquid crystal display terminal 1701 and the entered user name may be used as information for the determination.

The position estimation unit 1802 extracts information on deflection from the record selected from the deflection history (in this case, information on a deflection at 15 degrees for the right eye and a deflection at −15 degrees for the left eye) and provides the deflection control unit 403 with the extracted information.

This process makes it possible to estimate eye positions of a user (S204) even when detecting eye positions of a user using the eye cameras ends up in failure (S202, N in FIG. 22), so that displaying of images can be uninterruptedly continued.

The terminal state obtainment unit 1702 in Embodiment 2 may include a sensor other than the touch sensor or the inclination sensor to detect a state other than a touch or an inclination. For example, the liquid crystal display device 1701 may include a touch sensor on its back surface in addition to the touch sensor provided on its front surface of the liquid crystal display panel. This enables more accurate detection of positions of touches given by a user onto the liquid crystal display terminal.

In Embodiment 2, the liquid crystal display device 1701 may include a unit which allows the user 304 to adjust a deflection angle of the light deflection unit 302. For example, the unit may be a controller unit such as a switch or a button to be worked by the user 304. The deflection angle may be adjusted as a result of working on the unit. In this case, the result of detection of the eye positions of the user can be corrected so that crosstalk can be eliminated from 3D images on the display. In addition, the deflection angle of the light deflection unit 302 corrected by the user 304 is reflected upon the information stored in the deflection history storage unit 1803 so that eye positions of users can be estimated with higher accuracy.

Embodiment 3: Using a Single Camera

A configuration of a liquid crystal display device 2101 (see FIG. 23 for an example) will be described in Embodiment 3. In the configuration, the liquid crystal display device 2101 detects eye positions of a user using a single camera instead of a stereo camera.

Figure 23:
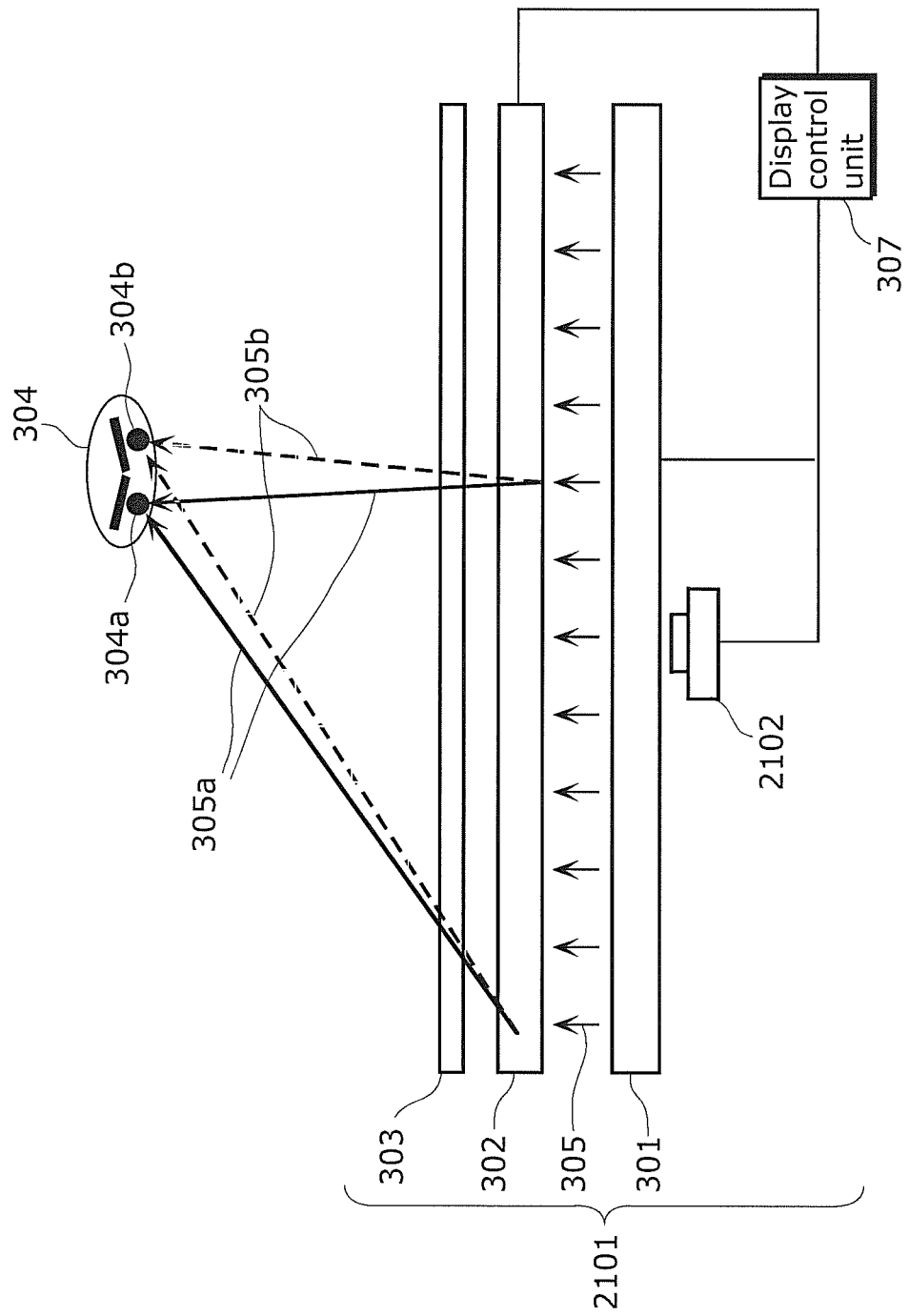
FIG. 23 illustrates an exemplary configuration of a liquid crystal display device in Embodiment 3 of the present invention.

FIG. 23 illustrates a configuration of the liquid crystal display device 2101 according to Embodiment 3.

Constituent elements equal to those in Embodiment 1 are referred to with the same reference signs, and thus detailed description thereof is omitted as appropriate.

In Embodiment 3, the liquid crystal display device 2101 includes an eye camera 2102 to detect eye positions of a user 304. Embodiment 3 and Embodiments 1 and 2 are different in that the eye camera 2102 is a single camera, so that, unlike with the stereo camera, it is difficult to estimate a distance to a subject based on a single image captured by the eye camera 2102. On the other hand, the liquid crystal display device 2101 can be provided at a lower cost.

Figure 24:
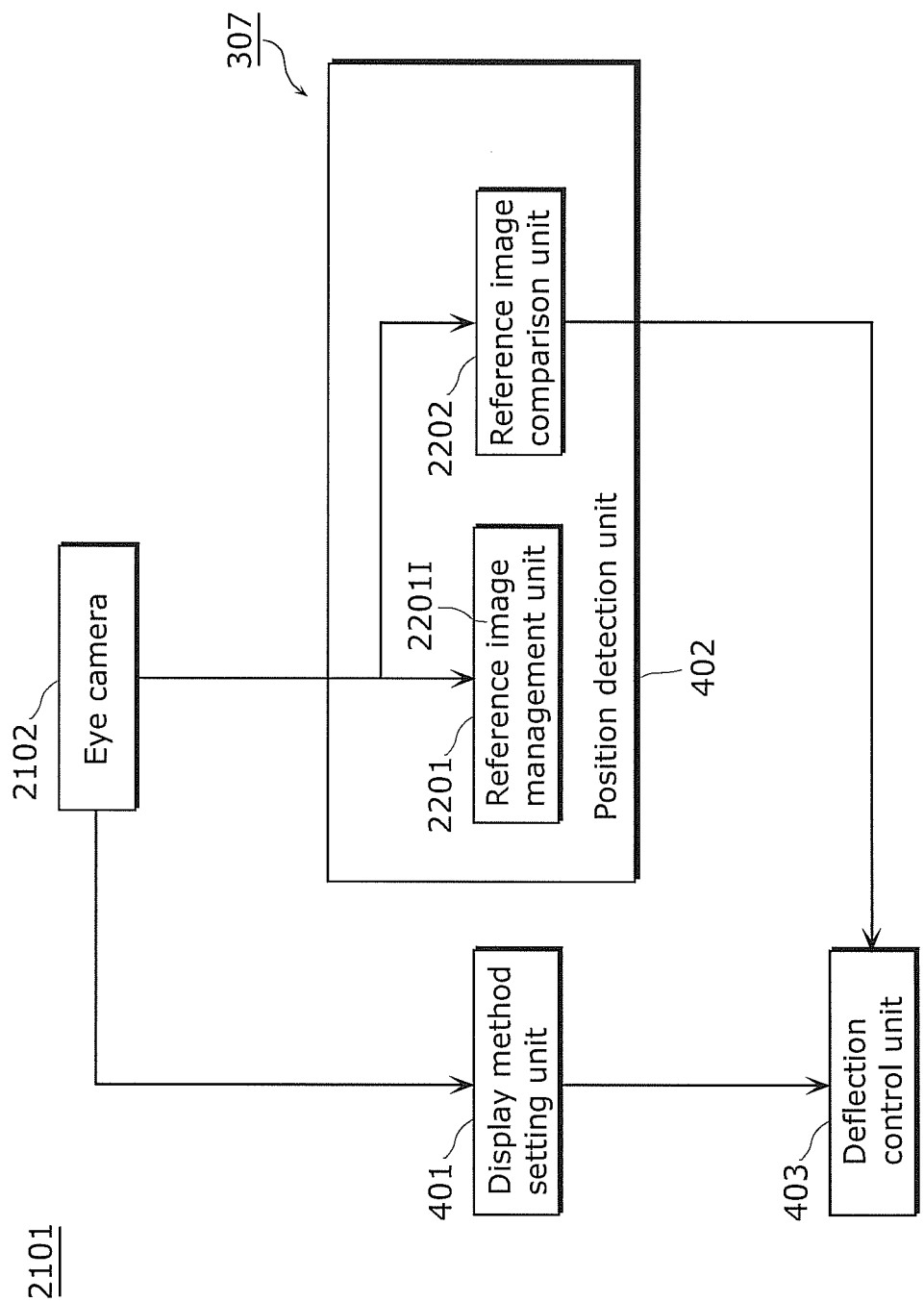
FIG. 24 is an exemplary function block diagram of a position detection unit in Embodiment 3 of the present invention.

FIG. 24 is a function block diagram for a position detection unit 402 (see FIG. 4) according to Embodiment 3.

A function of the display control unit 307 according to Embodiment 3 is described using the same set of blocks as the one in Embodiment 1 as illustrated in FIG. 4. Furthermore, in Embodiment 3, the position detection unit 402 has a function of detecting eye positions of the user 304 using the single camera 2102. The function of the position detection unit 402 is described using a set of blocks illustrated in FIG. 24.

Figure 25:
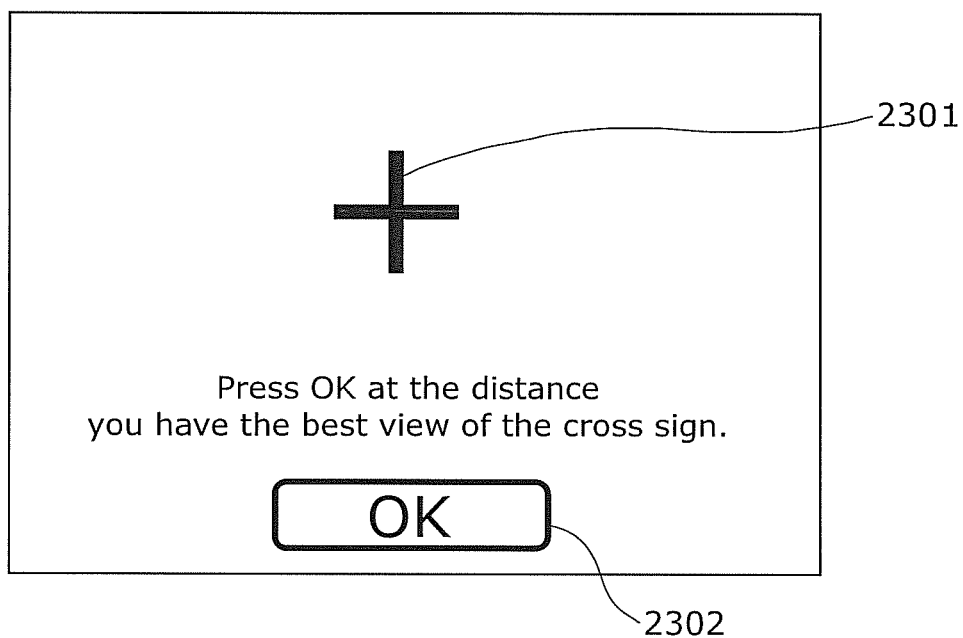
FIG. 25 illustrates an example of an image displayed to a user for generation of a reference image.

A reference image management unit 2201 generates a reference image for estimation of eye positions of a user using the single camera 2101 and manages the reference image. In Embodiment 3, the liquid crystal display device 2101 shows the user 304 an image for the generation of a reference image when the user 304 uses the liquid crystal display device 2101 for the first time. FIG. 25 illustrates an example of the image.

FIG. 25 illustrates an image 2301 displayed in 3D mode.

The user 304 adjusts the position of the user's head to find a viewing distance at which the user 304 can have the best view of the image 2301, and then press an OK button 2302.

The OK button 2302 is included in the image displayed on the liquid crystal display panel 303, and input to the OK button is detected by a touch sensor provided on the liquid crystal display panel 303.

Upon the pressing of the OK button 2302, the reference image management unit 2201 notifies the single camera 2102 of the input, captures a face image of the user 304 at that time, and stores the face image as a reference image. In addition, the reference image management unit 2201 obtains and stores information on a deflection angle of the light deflection unit 302 at that time.

Figure 26:
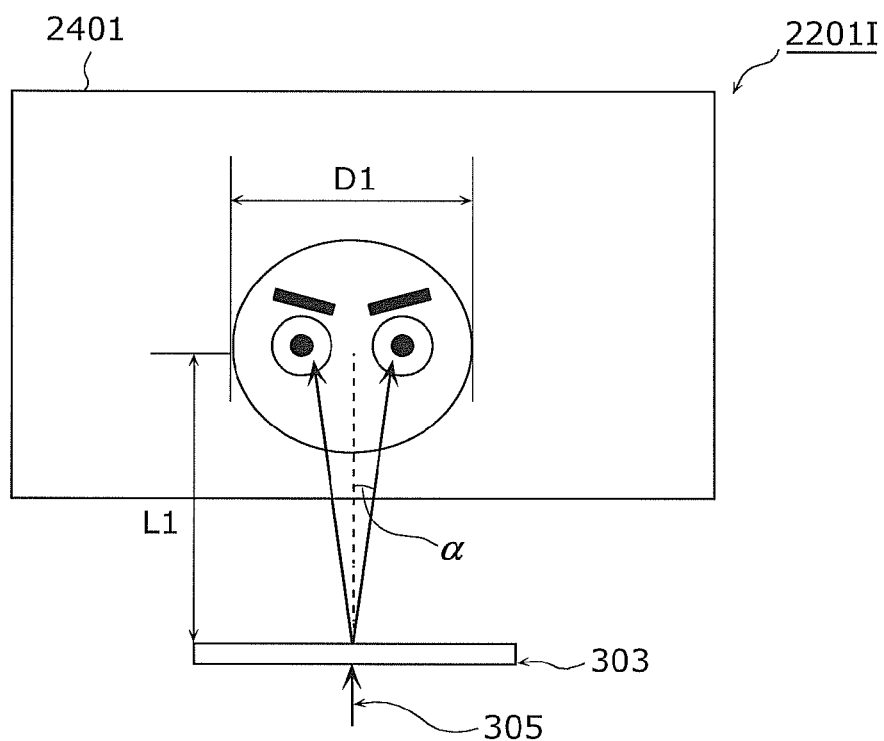
FIG. 26 illustrates an exemplary reference image of a user at a standard viewing distance.

FIG. 26 illustrates information 2201I (FIG. 24) to be stored in the reference image management unit 2201.

The information 2201I stored in the reference image management unit 2201 includes a reference image and information on a deflection angle. FIG. 26 illustrates an example of the reference image and others 2401. In this example, a face image of the user 304 having a size D1 is stored as an information item in the information 2201I. Furthermore, a deflection angle α is stored as information on a deflection angle. The deflection angle α is information necessary for causing illumination light 305 incident on a pixel at the center of the liquid crystal display panel 303 to enter the right eye of the user. The reference image management unit 2201 calculates a reference image viewing distance L1, which is a distance between the user 304 and the liquid crystal display device 2101, from the size D1 of the face image and the deflection angle α using an equation L1=D1/(2×tan α) (Equation 1).

A reference image comparison unit 2202 estimates eye positions of the user 304, based on an image captured by the single camera 2102, a reference image, and information on a deflection angle stored in the reference image management unit 2201 when a 3D image is displayed. Then, the reference image comparison unit 2202 controls angles at which the light deflection unit 302 deflects light, on the basis of the estimated positions.

Figure 27:
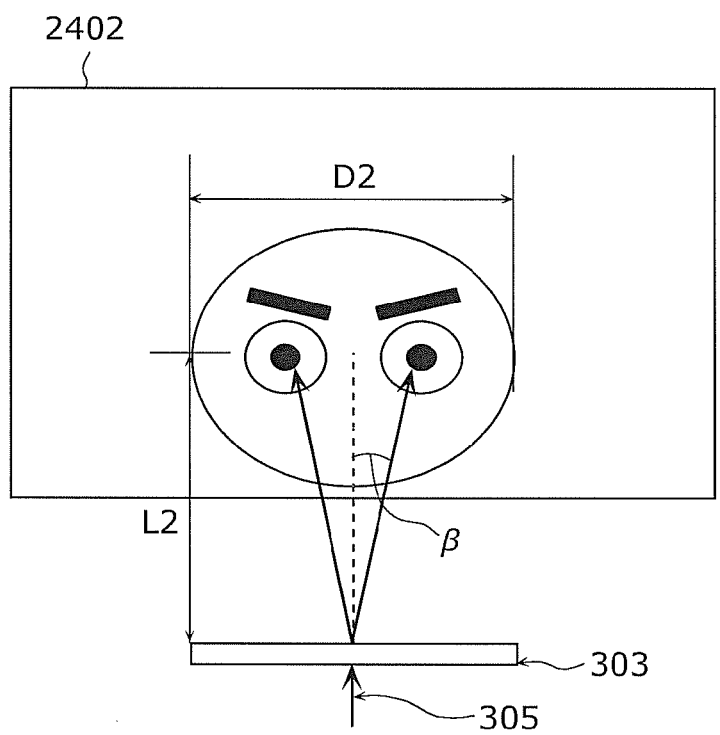
FIG. 27 illustrates an exemplary reference image of a user at a viewing distance shorter than the standard distance.

FIG. 27 illustrates an example of an image (image 2402) of the user 304 captured by the single camera 2102.

In this example, the user 304 is closer to the liquid crystal display device 2101 than when the reference image in FIG. 26 was captured. Accordingly, a size D2 of the face in the captured image is larger than the size D1 of the face in the reference image.

The reference image comparison unit 2202 calculates, from the sizes D1 and D2, the information on the deflection angle α, and the reference image viewing distance L1, a deflection angle β at which light is deflected to cause the light to enter the eye of the user 304 at the current position.

In the calculation according to Embodiment 3, the deflection angle β is calculated using an equation β=arctan ((D2×tan α)/D1) (Equation 2).

The reference image comparison unit 2202 notifies the deflection control unit 403 of the calculated value of the deflection angle β.

The deflection angle β is an information item necessary for deflecting light incident on a pixel at the center of the liquid crystal display panel toward an eye of the user. Use of the information item makes it possible to deflect light incident on pixels of the liquid crystal display panel 303 so that the light enters the eyes of the user 304.

In the above-described example in Embodiment 3, the user is closer to the liquid crystal display device 2101 than when the reference image was captured. Similarly, eye positions of a user can be obtained by performing a similar calculation when the user is farther from the liquid crystal display device 2101. Optionally, eye positions of a user can be obtained with higher accuracy by calculating a difference in the horizontal position of the head of the user between the image currently captured by the single camera and the reference image.

Alternatively, in Embodiment 3, data other than the face image of the user 304 may be used as a reference image. For example, an image of two eyes, or an image of glasses worn by a user may be used as a reference image. In this case, the amount of data is smaller than when face images are used.

Embodiment 4: Laser Safety

A liquid crystal display device which provides users with higher safety will be described in Embodiment 4.

Figure 28:
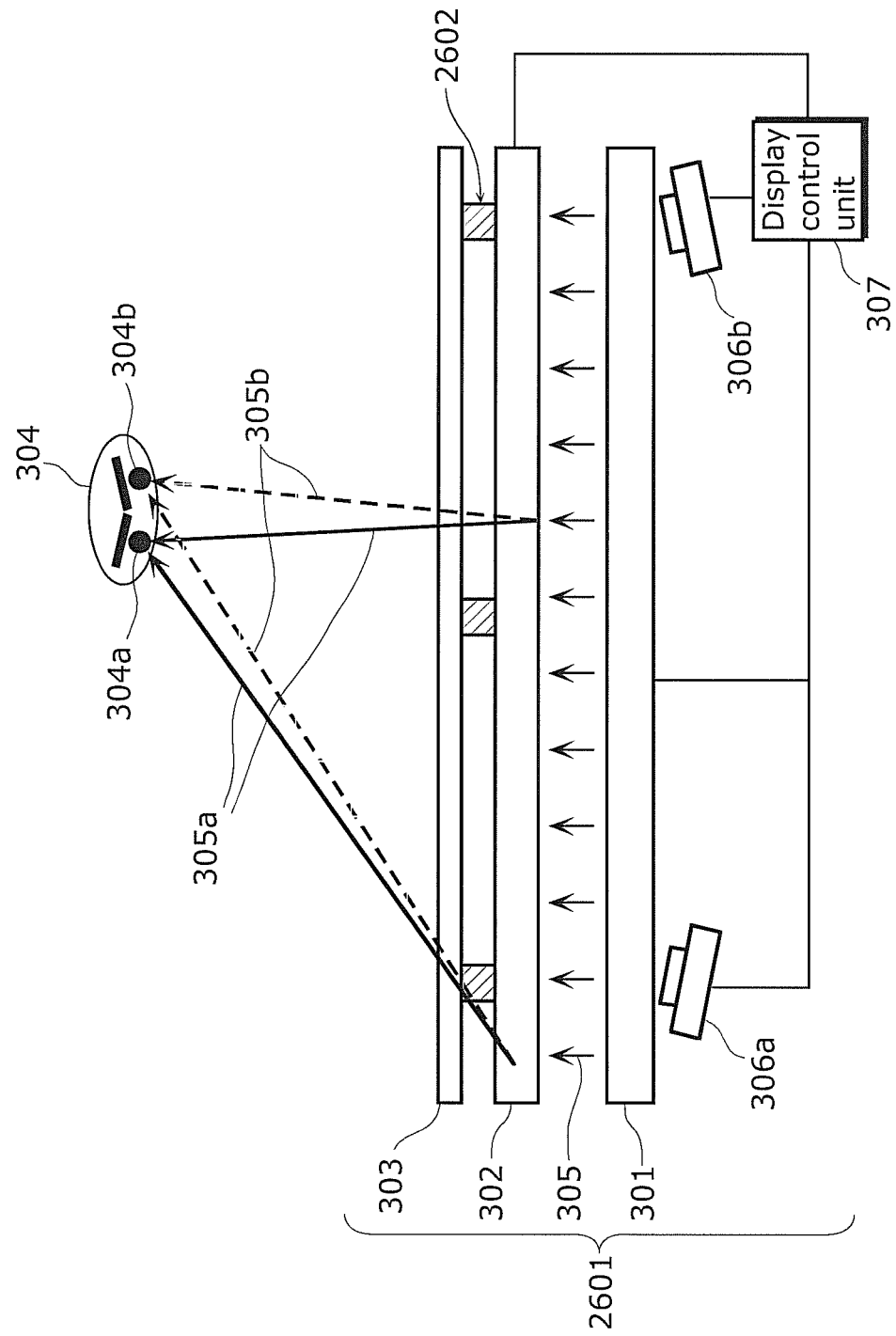
FIG. 28 illustrates an exemplary configuration of a liquid crystal display device in Embodiment 4 of the present invention.

FIG. 28 illustrates a configuration of the liquid crystal display device 2601 according to Embodiment 4.

Constituent elements equal to those in Embodiment 1 are referred to with the same reference signs, and thus detailed description thereof is omitted as appropriate.

In Embodiment 4, a light source 301 includes a laser light source and a light guide plate to produce illumination light 305 which evenly enters a light deflection unit 302.

Output evaluation units 2602 for measurement of intensity of the illumination light 305 are provided between the light deflection unit 302 and a liquid crystal display panel 303.

Figure 29:
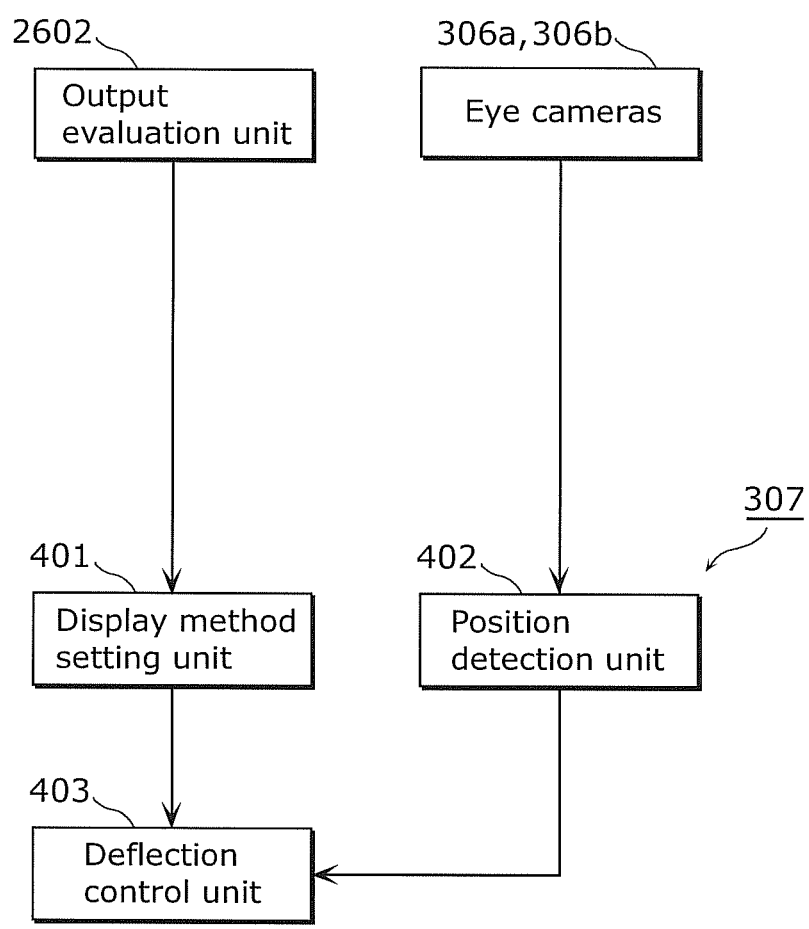
FIG. 29 is an exemplary function block diagram of a display method setting unit in Embodiment 4 of the present invention.

FIG. 29 illustrates a configuration of a display control unit 307 according to Embodiment 4. A function of the display control unit 307 according to Embodiment 4 is described using the same set of blocks as the one for Embodiment 1 illustrated in FIG. 4.

Furthermore, in Embodiment 4, a display method setting unit 401 receives data from the output evaluation units 2602. It is possible that the illumination light 305 is too strong, having an intensity which reaches or excesses a certain value. In this case, the display method setting unit 401 gives a notification to the deflection control unit 403 to prevent the excessively strong light from entering eyes of a user 304. Then, the deflection control unit 403 deflects the illumination light 305 in a direction other than a direction toward eyes of a user so that the illumination light 305 does not enter the eyes of the user. This prevents the user from seeing strong light.

In Embodiment 4, the output evaluation units 2602 between the light deflection unit 302 and the liquid crystal display panel 303 may be provided at other positions. For example, the output evaluation units 2602 may be provided between the light source 301 and the light deflection unit 302. This enables more accurate measurement of intensity of light from the light source.

The following operations are also possible.

Figure 30:
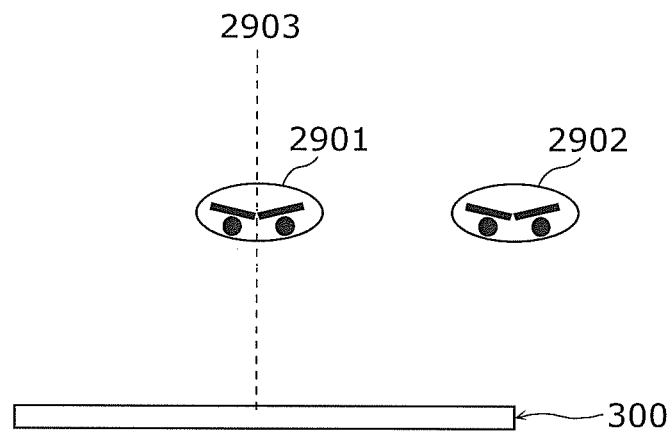
FIG. 30 illustrates an example of a first method of identifying a user.

FIG. 30 illustrates an example of a first method of identifying a user.

Referring to FIG. 30, a straight line 2903 passes through the center of a display surface of the liquid crystal display panel of a liquid crystal display device (for example, a liquid crystal display device 300). The straight line 2903 is perpendicular to the display surface. The straight line 2903 is shown in FIG. 30 for reasons of explanation only, and no constituent element of the liquid crystal display device 300.

Referring to FIG. 30, there are two users located side by side: a user 2901 and a user 2902. The user 2901 is less distant than the user 2902 from the straight line 2903 passing through the center of the display surface, and the user 2902 is a user more distant than the user 2901 from the straight line 2903.

In other words, a user identification unit 502 may identify whether a user whose position has been detected is the less distant user 2901 or the more distant user 2902.

When a user is identified as the less distant user 2901, the deflection control unit 403 may determine that the user as a current viewer. Specifically, in this case, the deflection control unit 403 deflects light 105 toward the user determined to be a current viewer. On the other hand, when a user is identified as the more distant user 2902, the deflection control unit 403 may determine that the user is not a current viewer.

Specifically, in this case, the deflection control unit 403 need not deflect light 105 toward the user 2902.

Figure 31:
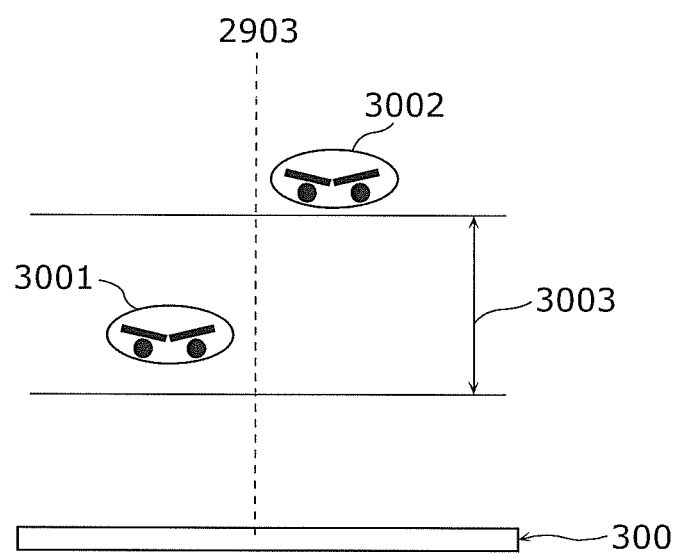
FIG. 31 illustrates an example of a second method of identifying a user.

FIG. 31 illustrates an example of a second method of identifying a user.

Referring to FIG. 31, two users 3001 and 3002 are located at the same distance from the straight line 2903 passing through the center of the display surface.

In this case, viewing distances to the liquid crystal display device 300 are used. FIG. 31 illustrates an appropriate viewing distance range 3003.

The user identification unit 502 may identify whether a user whose position has been detected is the user 3001 at a viewing distance within the viewing distance range 3003 or the user 3002 at a viewing distance out of the viewing distance range.

When a user is identified as the user 3001 at a viewing distance within the viewing distance range 3003, the deflection control unit 4003 may determine that the user is a current viewer. When a user is identified as the user 3002 at a viewing distance out of the viewing distance range 3003, the deflection control unit 4003 may determine that the user is not a current viewer.

It is also possible that there are plural users 3001 within the viewing distance range 3003. In this case, for example, the deflection control unit 403 may deflect light 105 toward a user at a shorter viewing distance from the liquid crystal display device 300, and not toward a user at a longer viewing distance. In this manner, images may be displayed only to the user at a shorter viewing distance but not to the user at a longer viewing distance.

Figure 32:
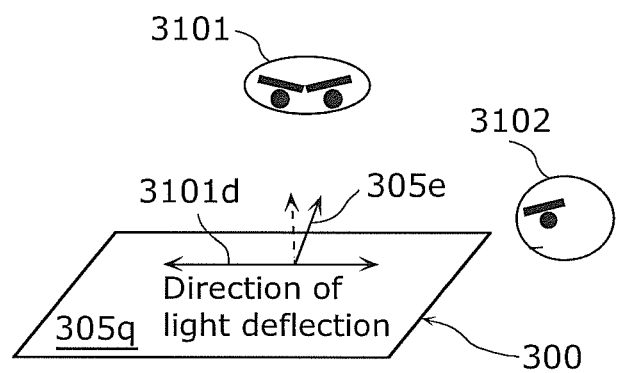
FIG. 32 illustrates an example of a third method of identifying a user.

FIG. 32 illustrates an example of a third method of identifying a user.

Referring to FIG. 32, two users 3101 and 3102 are looking at the screen of the liquid crystal display device 300 from different directions.

FIG. 32 shows a predetermined direction 3101$d$. The direction 3101$d$ is a direction along a line of intersection between a predetermined plane and a display surface 305$q$ of the liquid crystal display device 300.

The predetermined plane is perpendicular to the display surface 305$q$ and intersects a path of deflected light 305$e$.

Eyes of the user 3101 are positioned along a line (approximately) parallel to the direction 3101$d$.

In contrast, eyes of the user 3102 are positioned along a line which is neither parallel nor even approximately parallel to the direction 3101$d$.

Therefore, the light 105 can be deflected toward each eye of the user 3101 but not toward the eyes of the user 3102.

Here, a user whose position has been detected may be identified as the user 3101 for whom light can be deflected or the user 3102 for whom light cannot be deflected.

For example, when a user is identified as the user 3101 for whom light can be deflected, the user may be selected as a current viewer. When a user is identified as the user 3102 for whom light cannot be deflected, the user may not be selected as a current viewer.

Figure 33:
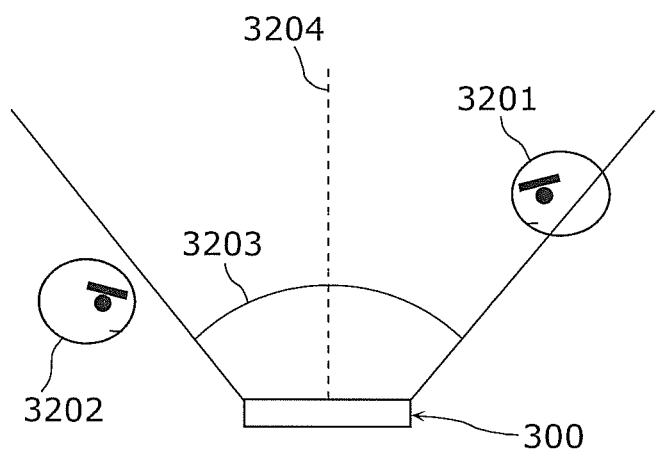
FIG. 33 illustrates an example of a fourth method of identifying a user.

FIG. 33 illustrates an example of a third method of identifying a user.

In this example, the liquid crystal display device 300 is disposed on a table or the like.

There are two users 3201 and 3202 in FIG. 33: one has a viewpoint located above the liquid crystal display device (for example, the right user in FIG. 33); and the other has a viewpoint located below the liquid crystal display device (for example, the left user in FIG. 33). The following operation may be performed for the users 3201 and 3202.

In this operation, a viewing angle range 3203 of the liquid crystal display device 300 is used. For example, eye positions of the user 3201 are located within the viewing angle range 3203, and eye positions of the user 3202 are located out of the viewing angle range 3203.

Here, a user whose position has been detected may be identified as the user 3201 located within the viewing angle range 3203 or the user 3202 located out of the viewing angle range 3203.

When a user is determined to be the user 3201 located within the viewing angle range 3203, the user may be selected as a current viewer and an image is displayed to the user. When a user is determined to be the user 3202 located out of the viewing angle range 3203, the user may not be selected as a current viewer and an image is not displayed to the user.

It is also possible that there are plural users 3201 located within the viewing angle range 3203. For example, when there are plural users 3201 located within the viewing angle range 3203, a user closer to a central axis 3204 of the display (the liquid crystal display panel 303) may be selected as a current viewer and an image is displayed to the user. In other words, the more distant user may not be selected as a current viewer and an image is not displayed to the user.

Such determination of a current viewer may be made using the method for horizontal directions (see FIGS. 30, 31, and 32) and the method for vertical directions (see FIG. 33) in combination.

It should be noted that the above-described embodiments are provided for illustrative purposes, and the present invention includes various embodiments unless they depart from the spirit and scope of the present invention.

Each of the structural elements in each of the above-described embodiments may be configured in the form of an exclusive hardware product, or may be realized by executing a software program suitable for the structural element. The constituent elements may be implemented by a program execution unit such as a CPU or a processor which reads and executes a software program recorded on a recording medium such as a hard disk or a semiconductor memory.

For example, an integrated circuit may be used which is included in a display device including: a light source which emits light; a light deflection unit configured to deflect the emitted light toward an eye position of a user of the display device; and a display unit configured to receive the light from the light deflection unit and display an image formed by the light, the integrated circuit including: a position detection unit configured to detect the eye position of the user; an identification unit configured to identify which one of persons is the user; and a control unit configured to control a direction in which the light deflection unit deflects the light, depending on the person identified as the user.

Furthermore, a program for the display device according to the embodiments is a program for causing a computer which is, for example, a display device including: a light source which emits light; a light deflection unit configured to deflect the emitted light toward an eye position of a user of the display device; and a display unit configured to receive the light from the light deflection unit and display an image formed by the light, to execute: detecting the eye position of the user; identifying which one of persons is the user; and controlling a direction in which the light is deflected in the deflecting, depending on the person identified as the user.

INDUSTRIAL APPLICABILITY

The illumination device according to any of the above-described embodiments or the liquid crystal display device including the illumination device is configured as a 3D liquid crystal display device or a privacy display which has a wide viewing angle and short viewing distance from viewers to its liquid crystal display panel while showing the viewer high-quality images with enhanced sense of presence, and is capable of following viewing points of the viewers. The liquid crystal display device is also capable of easily switching between 2D mode and 3D mode. These advantageous effects are all achieved with a simple configuration at low power consumption. The present invention is therefore advantageously applicable to general liquid crystal display devices to be used as 3D display devices switchable between 2D mode and 3D mode or privacy displays.

REFERENCE SIGNS LIST 300 liquid crystal display device
301 light source
302 light deflection unit
303 liquid crystal display panel
304 user
304$a$ right eye
304$b$ left eye
305 illumination light
305$a$ light for right eye
305$b$ light for left eye
306$a$, 306$b$ eye camera
307 display control unit
402 position detection unit
403 deflection control unit
502 user identification unit

The invention claimed is:

1. A display device comprising:
a light source which emits light;
a position detection unit configured to detect an eye position of a person;
a light deflection unit configured to deflect the light;
an identification unit configured to identify the person;
a control unit configured to control a deflecting direction in which the light deflection unit deflects the light;
a display unit configured to receive the light from the light deflection unit and display an image formed by the light, the image including a region set to be a security region; and
a display information management unit configured to hold access right information indicating whether or not the person has a right to access an information item displayed in the security region,
wherein the control unit is configured to (i) control the deflecting direction in which the light deflection unit deflects the light, according to whether or not the access right information indicates that the person has a right to access the information item and (ii) when the access right information indicates that the person does not have the right to access the information item, cause the light deflection unit to deflect light in the security region away from the eye position of the person and light in a region other than the security region toward the eye position of the person,
the position detection unit is configured to recognize an eye position of each of a plurality of persons,
the control unit is configured to cause the light deflection unit to deflect the light toward the plurality of persons in sequence in a time-division manner to allow the plurality of persons to view the image,
the display information management unit holds access right information for each of the plurality of persons, the control unit is configured to cause the light deflection unit to deflect light in an entire region of the image toward the eye position of a first person among the plurality of persons, the first person being indicated by the access right information as a person having the right, and the control unit is configured to cause the light deflection unit to deflect light in the security region away from the eye position of a second person among the plurality of persons, the second person being indicated by the access right information as a person not having the right.

2. The display device according to claim 1, comprising a user image capturing unit configured to capture an image of the person, wherein the identification unit is configured to perform the identifying, based on the image of the person captured by the user image capturing unit.

3. The display device according to claim 2, comprising a shape recognition unit configured to recognize at least one of a contour or an eye shape of the person in an image captured by the user image capturing unit, wherein the identification unit is configured to perform the identifying using the recognized at least one of the contour or the eye shape of the person.

4. The display device according to claim 1, wherein the identification unit is configured to receive the access right information, which is emitted from a signaling device to perform the identifying.

5. The display device according to claim 1, wherein the display unit is capable of alternately displaying a right-eye disparity image and a left-eye disparity image for displaying an image in three-dimensional mode, the identification unit is configured to hold display mode information for determining, for the person, whether the image is to be displayed in two-dimensional mode or in the three-dimensional mode, and when the image is determined, according to the display mode information, to be displayed in the two-dimensional mode for the person, the control unit is configured to control the deflecting direction by causing the light deflection unit to deflect the light toward a position of a right eye of the person while the display unit is displaying the right-eye disparity image and the light toward a position of a left eye of the person while the display unit is displaying the left-eye disparity image.

6. The display device according to claim 1, comprising a terminal state obtainment unit configured to obtain terminal information indicating at least one of a position of a hand of the person holding a terminal or an inclination of the terminal, wherein the position detection unit includes a deflection history storage unit configured to store position information on the eye position of the person and the terminal information in association with each other, and the position detection unit is configured to search for the information associated with the terminal information to estimate an eye position of the person.

7. The display device according to claim 6, wherein the position information is operation history of the light deflection unit.

8. The display device according to claim 7, comprising a manual deflection adjustment unit configured to allow the person to adjust the deflecting direction of the light deflection unit.

9. The display device according to claim 1, comprising a user image capturing unit configured to capture an image of the person, wherein the position detection unit is configured to store a reference image which is an image of the person looking at the display device at a standard viewing distance, and based on estimation of a viewing distance of the person by comparison of the image captured by the user image capturing unit to the reference image, determine the eye position of the person.

10. The display device according to claim 9, wherein the identification unit is configured to identify whether the person is less distant than another person from a straight line passing through a center of a display surface of the display device or the other person more distant than the person from the straight line, and the control unit is configured to cause the light to enter the detected position when the person is identified as the less distant person, and prevent the light from entering the detected position when the person is identified as the more distant person.

11. The display device according to claim 1, comprising an output evaluation unit configured to evaluate intensity of the light emitted from the light source, wherein when the output evaluation unit evaluates the intensity as being higher than a reference value, the light deflection unit is configured to set the deflecting direction of the light deflection unit to prevent the light from entering an eye of the person.

12. The display device according to claim 1, wherein the identification unit is configured to determine whether or not a viewing distance which is a distance between the person and the display device is within a predetermined range, and the control unit is configured to cause the light deflection unit to deflect the light toward the eye position of the person when the viewing distance is within the predetermined range, and cause the light deflection unit to deflect the light away from the eye position of the person when the viewing distance is not within the predetermined range.

13. The display device according to claim 1, wherein the identification unit is configured to determine whether or not the person is located within a viewing angle range of the display device, and the control unit is configured to cause the light deflection unit to deflect the light toward the eye position of the person when the person is determined to be located within the viewing angle range, and cause the light deflecting unit to deflect the light away from the eye position of the person when the person is determined to be not located within the viewing angle range.

14. A display device comprising:

a light source which emits light;
a position detection unit configured to detect an eye position of a person;
a light deflection unit configured to deflect the light;
an identification unit configured to identify the person;
a control unit configured to control a deflecting direction in which the light deflection unit deflects the light;
a display unit configured to receive the light from the light deflection unit and display an image formed by the light, the image including a region set to be a security region; and
a display information management unit configured to hold access right information indicating whether or not the person has a right to access an information item displayed in the security region, wherein the control unit is configured to (i) control the deflecting direction in which the light deflection unit deflects the light, according to whether or not the access right information indicates that the person has a right to access the information item and (ii) when the access right information indicates that the person does not have the right to access the information item, cause the light deflection unit to deflect light in the security region away from the eye position of the person and light in a region other than the security region toward the eye position of the person, the position detection unit is configured to recognize an eye position of each of a plurality of persons, the control unit is configured to cause the light deflection unit to deflect the light toward the plurality of persons in sequence in a time-division manner to allow the plurality of persons to view the image, the identification unit is configured to identify a person among a plurality of persons as a user and determined whether or not eyes of each person other than the user among the plurality of persons are positioned along a line parallel to a direction from one eye to the other eye of the user, and the control unit is configured to cause the light deflection unit to deflect the light toward the eye position of a person other than the user when the eyes of the person other than the user are determined to be positioned along a line parallel to the direction from one eye to the other eye of the user, and cause the light deflection unit to deflect the light away from the eye position of the person other than the user when the eyes of the person other than the user are determined to be not positioned along a line parallel to the direction from one eye to the other eye of the user.

15. A display method comprising:

causing a light source to emit light;

detecting an eye position of a person;

causing a light deflection unit to deflect the light;

identifying the person;

receiving the light deflected by the light deflecting unit and displaying an image including a region set to be a security region, the receiving and the displaying being performed by a display device; and (i) controlling, using a control unit, a deflecting direction in which the light deflection unit deflects the light, according to whether or not access right information held by a display information management unit, which indicates whether or not the person has a right to access an information item displayed in the security region, indicates that the person has a right to access the information item and (ii) causing, using the control unit, the light deflection unit to deflect light in the security region away from the eye position of the person and the light outside the security region toward the eye position of the person, when the access right information indicates that the person does not have the right to access the information item, wherein the detecting includes recognizing an eye position of each of a plurality of persons, the controlling and causing includes causing, using the control unit, the light deflection unit to deflect the light toward the plurality of persons in sequence in a time-division manner to allow the plurality of persons to view the image, the display information management unit holds access right information for each of the plurality of persons, the controlling and causing includes causing, using the control unit, the light deflection unit to deflect light in an entire region of the image toward the eye position of a first person among the plurality of persons, the first person being indicated by the access right information as a person having the right, and the controlling and causing includes causing, using the control unit, the light deflection unit to deflect light in the security region away from the eye position of a second person among the plurality of persons, the second person being indicated by the access right information as a person not having the right.

16. An integrated circuit which is included in a display device including:

a light source which emits light;

a light deflection unit configured to deflect the light;

a display unit configured to receive the light from the light deflection unit and display an image formed by the light, the image including a region set to be a security region, the integrated circuit comprising:

a position detection unit configured to detect an eye position of a person;

an identification unit configured to identify the person; and a control unit configured to (i) control a deflecting direction in which the light deflection unit deflects the light, according to whether or not access right information, which indicates whether or not the person has a right to access an information item displayed in the security region, indicates that the person has a right to access the information item and (ii) when the access right information indicates that the person does not have the right to access the information item, cause the light deflection unit to deflect light in the security region away from the eye position of the person and light in a region other than the security region toward the eye position of the person, wherein the position detection unit is configured to recognize an eye position of each of a plurality of persons, the control unit is configured to cause the light deflection unit to deflect the light toward the plurality of persons in sequence in a time-division manner to allow the plurality of persons to view the image, the display information management unit holds access right information for each of the plurality of persons, the control unit is configured to cause the light deflection unit to deflect light in an entire region of the image toward the eye position of a first person among the plurality of persons, the first person being indicated by the access right information as a person having the right, and the control unit is configured to cause the light deflection unit to deflect light in the security region away from the eye position of a second person among the plurality of persons, the second person being indicated by the access right information as a person not having the right.

17. A non-transitory computer-readable recording medium for use in a computer, the recording medium having a program recorded thereon for causing a computer which is a display device including:

a light source which emits light;

a light deflection unit configured to deflect the light; and a display unit configured to receive the light from the light deflection unit and display an image formed by the light, the image including a region set to be a security region, to execute:
detecting an eye position of a person;
identifying the person; and
(i) controlling, using a control unit, a deflecting direction in which the light deflection unit deflects the light, according to whether or not access right information, which indicates whether or not the person has a right to access an information item displayed in the security region, indicates that the person has a right to access the information item and (ii) causing, using the control unit, the light deflection unit to deflect light in the security region away from the eye position of the person and light in a region other than the security region toward the eye position of the person, when the access right information indicates that the person does not have the right to access the information item,
wherein the detecting includes recognizing an eye position of each of a plurality of persons, the controlling and causing includes causing, using the control unit, the light deflection unit to deflect the light toward the plurality of persons in sequence in a time-division manner to allow the plurality of persons to view the image,
the display information management unit holds access right information for each of the plurality of persons,
the controlling and causing includes causing, using the control unit, the light deflection unit to deflect light in an entire region of the image toward the eye position of a first person among the plurality of persons, the first person being indicated by the access right information as a person having the right, and
the controlling and causing includes causing, using the control unit, the light deflection unit to deflect light in the security region away from the eye position of a second person among the plurality of persons, the second person being indicated by the access right information as a person not having the right.

* * * * *